United States Patent
Lukacs et al.

(10) Patent No.: US 12,459,162 B2
(45) Date of Patent: Nov. 4, 2025

(54) ATTACHMENTS FOR FABRICATED CUSTOM OBJECTS

(71) Applicant: Align Technology, Inc., San Jose, CA (US)

(72) Inventors: Gabor Lukacs, Raleigh, NC (US); Jack Shaw, Durham, NC (US); Alexey Kalinichenko, Cary, NC (US); Arthur George Butz, Durham, NC (US); Mehdi Mojdeh, Fremont, CA (US); Enrique Soltero Borrego, Ciudad Juárez (MX)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 18/624,981

(22) Filed: Apr. 2, 2024

(65) Prior Publication Data

US 2024/0293960 A1  Sep. 5, 2024

Related U.S. Application Data

(63) Continuation of application No. 17/117,880, filed on Dec. 10, 2020, now Pat. No. 11,975,463.

(60) Provisional application No. 62/946,776, filed on Dec. 11, 2019.

(51) Int. Cl.
| | |
|---|---|
| *A61C 13/00* | (2006.01) |
| *A61C 7/08* | (2006.01) |
| *A61C 13/34* | (2006.01) |
| *B29C 33/30* | (2006.01) |
| *B29C 33/38* | (2006.01) |
| *B33Y 80/00* | (2015.01) |
| *A61C 7/00* | (2006.01) |

(52) U.S. Cl.
CPC ............... *B29C 33/30* (2013.01); *A61C 7/08* (2013.01); *A61C 13/0027* (2013.01); *A61C 13/34* (2013.01); *B29C 33/3842* (2013.01); *B33Y 80/00* (2014.12); *A61C 7/002* (2013.01)

(58) Field of Classification Search
CPC .......................... A61C 13/0027; A61C 13/34
See application file for complete search history.

(56) References Cited

U.S. PATENT DOCUMENTS

| | | |
|---|---|---|
| 6,210,162 B1 | 4/2001 | Chishti et al. |
| 6,309,215 B1 | 10/2001 | Phan et al. |
| 6,450,807 B1 | 9/2002 | Chishti et al. |
| 6,497,574 B1 | 12/2002 | Miller |
| 6,749,414 B1 | 6/2004 | Hanson et al. |
| 6,830,450 B2 | 12/2004 | Knopp et al. |

(Continued)

*Primary Examiner* — Timothy Kennedy
(74) *Attorney, Agent, or Firm* — Lowenstein Sandler LLP

(57) ABSTRACT

A system includes a mold of a dental arch of a patient. The mold includes teeth extending from a first distal end of the dental arch to a second distal end of the dental arch. An orthodontic aligner is to be formed over the teeth of the mold. The teeth of the mold are shaped to correspond to tooth-receiving cavities of the orthodontic aligner. The system includes a pre-fabricated attachment that includes a traceability component configured to be used to determine one or more identifiers corresponding to the mold. The pre-fabricated attachment further includes a handling component configured to be secured by a robot or person to transport the mold and the pre-fabricated attachment during production of the orthodontic aligner.

20 Claims, 14 Drawing Sheets

(56) References Cited

U.S. PATENT DOCUMENTS

| | | |
|---|---|---|
| 6,957,118 B2 | 10/2005 | Kopelman et al. |
| 6,976,627 B1 * | 12/2005 | Culp .................. B33Y 80/00 |
| | | 235/462.01 |
| 7,092,784 B1 | 8/2006 | Simkins |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 * | 10/2009 | Culp .................... G06K 1/121 |
| | | 235/494 |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,892,474 B2 | 2/2011 | Shkolnik et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,943,386 B2 | 4/2018 | Webber et al. |
| 9,943,991 B2 | 4/2018 | Tanugula et al. |
| 10,336,102 B2 | 7/2019 | Cole |
| 10,495,973 B2 | 12/2019 | Cole |
| 10,783,629 B2 | 9/2020 | Parpara et al. |
| 10,888,395 B2 | 1/2021 | Kopelman |
| 11,189,021 B2 | 11/2021 | Shah et al. |
| 11,295,444 B2 | 4/2022 | Cherkas et al. |
| 11,420,362 B2 | 8/2022 | Mojdeh et al. |
| 11,511,485 B2 | 11/2022 | Mojdeh et al. |
| 11,534,277 B2 | 12/2022 | Chavez et al. |
| 11,602,413 B2 | 3/2023 | Chen et al. |
| 11,666,415 B2 | 6/2023 | Wang et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2014/0061974 A1 | 3/2014 | Tyler |
| 2014/0265034 A1 | 9/2014 | Dudley |
| 2015/0097315 A1 | 4/2015 | DeSimone et al. |
| 2018/0263730 A1 * | 9/2018 | Sirovskiy ................. A61C 7/08 |
| 2020/0008911 A1 * | 1/2020 | Savic .................. A61C 9/0053 |
| 2020/0246119 A1 * | 8/2020 | Long ...................... B29C 64/20 |
| 2020/0290262 A1 | 9/2020 | Aguilar Mendez et al. |
| 2021/0030516 A1 | 2/2021 | O'Leary et al. |
| 2021/0045854 A1 * | 2/2021 | Culp ................... B23K 26/103 |
| 2021/0045855 A1 * | 2/2021 | Long ........................ A61C 7/08 |
| 2021/0128275 A1 * | 5/2021 | Suh ....................... A61C 9/004 |

* cited by examiner

750

Apply a first orthodontic appliance to a patient's teeth to reposition the teeth from a first tooth arrangement to a second tooth arrangement 760

Apply a second orthodontic appliance to the patient's teeth to reposition the teeth from the second tooth arrangement to a third tooth arrangement 770

ATTACHMENTS FOR FABRICATED CUSTOM OBJECTS

RELATED APPLICATION

This application is the continuation of Non-Provisional application Ser. No. 17/117,880, filed Dec. 10, 2020 which claims the benefit of Provisional Application No. 62/946,776, filed Dec. 11, 2019, the entire contents of which are incorporated by reference herein.

TECHNICAL FIELD

Embodiments of the present invention relate to the field of attachments and, in particular, pre-fabricated attachments for handling and tracking fabricated custom objects.

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold is of a dental arch for a patient and the shell is an aligner to be used for aligning one or more teeth of the patient.

Molds may be formed using rapid prototyping equipment such as three-dimensional (3D) printers, which may manufacture the molds using additive manufacturing techniques (e.g., stereolithography) or subtractive manufacturing techniques (e.g., milling). The aligners are then fabricated using the molds via various production operations such as heating, thermoforming, trimming, etc.

Each mold corresponds to a patient and a treatment stage of the patient. The production operations may be specific to the patient and treatment stage. For example, a first aligner may be trimmed different than a second aligner, wherein the first and second aligners correspond to different patients and/or treatment stages. The patient and treatment stage corresponding to a mold are to be identified throughout production of an aligner and the resulting aligner is to be associated with the patient and treatment stage.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a system includes a mold including a physical model of a dental arch of a patient. An orthodontic aligner is to be formed over the physical model and one or more first features. The system further includes a pre-fabricated attachment including one or more second features configured to removably attach to the one or more first features and a traceability component configured to be used to determine one or more identifiers corresponding to the mold.

In another aspect of the disclosure, a method includes identifying a mold including a physical model of a dental arch of a patient and one or more first features. An orthodontic aligner is to be formed over the physical model. The method further includes causing a pre-fabricated attachment to be attached to the mold via the one or more first features of the mold and one or more second features of the pre-fabricated attachment. The method further includes associating a traceability component of the pre-fabricated attachment with a patient identifier (PID) of the patient and a treatment stage corresponding to the mold. The method further includes causing a handling component of the pre-fabricated attachment to be secured by a robot to transport the mold and the pre-fabricated attachment during production of the orthodontic aligner.

In another aspect of the disclosure, a pre-fabricated attachment for a mold includes one or more attachment features configured to removably attach to one or more mold features of the mold. The mold includes a physical model of a dental arch of a patient at a treatment stage of an orthodontic treatment of the patient. An orthodontic aligner is to be formed over the physical model. The pre-fabricated attachment further includes a traceability component configured to be used to determine one or more identifiers corresponding to the mold. The pre-fabricated attachment further includes a handling component configured to be secured by a robot to transport the mold and the pre-fabricated attachment during production of the orthodontic aligner.

BRIEF DESCRIPTION OF THE DRAWINGS

The present invention is illustrated by way of example, and not by way of limitation, in the figures of the accompanying drawings.

FIGS. 2G-1 illustrate views of a mold attached to a pre-fabricated attachment, according to certain embodiments.

DETAILED DESCRIPTION

Figure 1A:
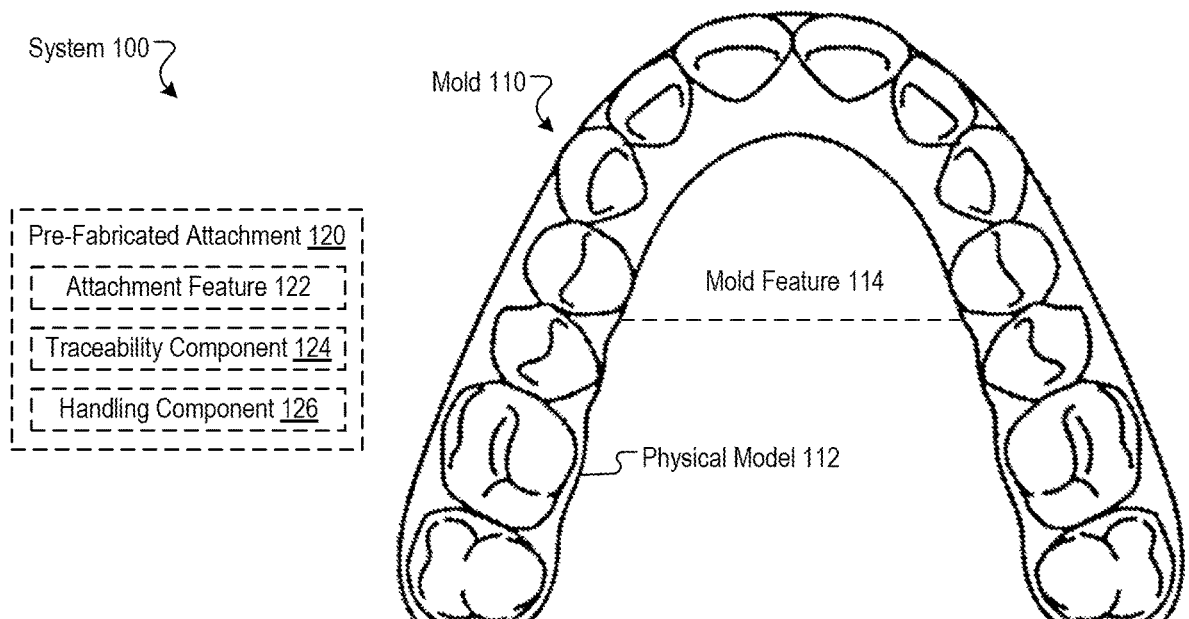
FIGS. 1A-C illustrate views of a mold configured to attach to a pre-fabricated attachment, according to certain embodiments.

Described herein are embodiments of pre-fabricated attachments for three-dimensional (3D) printed objects, which may be used for fabricating custom objects. Custom objects (e.g., orthodontic aligners) may be produced by forming a shell over a mold. The mold may be a 3D printed object. The mold may undergo one or multiple manufacturing operations, and it may be important to track the mold throughout manufacturing. In embodiments, pre-fabricated attachments may be attached to such a mold (or other 3D printed object), and may be used to track the mold (or other 3D printed object).

For example, production of an orthodontic aligner includes performing 3D printing to form a mold of a dental arch, and then performing multiple production operations using the mold of the dental arch, such as heating, thermoforming, trimming, milling, polishing etc. One or more of the operations may be different for different orthodontic aligners. For example, a first aligner may be trimmed different than a second aligner. Multiple unique molds may be produced (e.g., a unique mold for each treatment stage of each patient) and corresponding orthodontic aligners may be produced using the different molds. The patient and treatment stage of each mold and aligner are to be identified during production of aligners. Failure to identify the correct patient and treatment stage corresponding to each mold during aligner production may result in one or more of misplacing a mold or aligner, performing the wrong production operation, decreased speed of production, increased inaccuracies, increased damage to aligners, decreased efficacy of aligners, decreased comfort of patients, providing the wrong aligner to a patient, or the like.

Conventionally, for identification of the patient and treatment stage corresponding to a mold, a first identifier (e.g., matrix barcode) is 3D printed onto the mold for machine readability and a second identifier (e.g., alphanumeric annotation tag) is 3D printed onto the mold for human readability. The 3D printing of the identifiers uses extra material and build time. The identifiers may be difficult to read, may become blocked or damaged, and are not reusable for subsequent molds. Once an aligner has been produced using a mold that has 3D-printed identifiers, the mold that has the 3D-printed identifiers is discarded and new molds are produced with new 3D-printed identifiers, thus requiring extra materials and build times, for example.

Embodiments described herein are related to a pre-fabricated attachment for attachment to custom 3D printed objects, which may be used for fabricating still further custom objects, such as orthodontic aligners. In one embodiment, a system includes a mold and a pre-fabricated attachment. The mold includes a physical model of a dental arch (e.g., of an upper or a lower jaw including one or more teeth) of a patient, and an orthodontic aligner is to be formed over the physical model. The mold further includes one or more mold features (e.g., a flattened area forming one or more holes, etc.). The pre-fabricated attachment includes one or more attachment features (e.g., one or more protrusions, latch, etc.) configured to removably attach to the one or more mold features.

The pre-fabricated attachment further includes a traceability component configured to be used to determine one or more identifiers corresponding to the mold. In the use case of orthodontics and/or dentistry, the identifiers may be associated with (e.g., indicate or specify) a patient identifier (PID) corresponding to a patient, treatment stage corresponding to the mold, and/or an indication of whether the mold corresponds to the upper jaw or the lower jaw, for example. In other use cases, the identifiers may provide other unique information associated with a 3D printed object. The traceability component may be associated with an attachment identifier and a database may associate the attachment identifier with the PID and treatment stage identifier. The database and the attachment identifier may be used to track the mold throughout the production of the aligner (e.g., heating, thermoforming, edge cutting, trimming, etc.). The traceability component may include one or more of a radio-frequency identification (RFID) tag, a near field communication (NFC) tag, a data matrix, a barcode, a matrix barcode, a two-dimensional barcode, a three-dimensional barcode, an annotation tag, a digital identifier, an optical identifier, an engraved surface, or the like. The traceability component may include a code (e.g., up to a 10-digit code, 7-digit code, 8-digit code, 9-digit code, etc.). The code may be any combination of numeric, alphabetical, or symbolic, for example.

The pre-fabricated attachment may include a handling component that is to be secured by a robot or a person to transport the mold and the pre-fabricated attachment during production of the aligner. In some embodiments, the pre-fabricated attachment includes a structure (e.g., beam or bar) that extends from a first lingual portion (e.g., left lingual side) of the physical model to a second lingual portion (e.g., right lingual side) of the physical model. The structure may include the traceability component (e.g., beam with an alphanumerical identifier engraved in or punched through the beam) and the handling component (e.g., grasper) may extend from the traceability component and/or the structure.

In some embodiments, the pre-fabricated attachment is removably attached to a mold. A pre-fabricated attachment may be associated with one or more first identifiers associated with a first patient and a first treatment stage. After forming a first aligner for the first patient and the first treatment stage using a first mold, the pre-fabricated attachment may be removed from the first mold and attached to a second mold (e.g., the pre-fabricated attachment is associated with the identifier associated with one patient and one treatment stage and after forming the aligner for this patient and this treatment stage using a mold, the pre-fabricated attachment may be removed from this mold and attached to another mold). The first mold may be discarded or recycled. The pre-fabricated attachment may be associated with one or more second identifiers associated with a second patient and/or a second treatment stage to produce a second aligner different from the first aligner. By using, and re-using, the pre-fabricated attachment, each mold may use less material and take less time to produce compared to conventional molds.

Use of the pre-fabricated attachment with molds may increase speed of aligner production (because there is less to print), decrease aligner inaccuracies, decrease damaged aligners, increase efficacy of the aligners, and decrease quality issues of aligners. Additionally, use of the pre-fabricated attachment may reduce the amount of material that is used to print 3D printed objects, and may accordingly reduce a cost of printing 3D printed objects.

Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.), custom athletic mouth guards, and/or shells for non-dental applications. Accordingly, it should be understood that embodiments herein that refer to aligners also apply to other types of shells. For example, the principles, features and methods discussed may be applied to any application or process in which it is useful identify a mold and a shell produced using the mold, where the shell is a form fitting device such as eye glass frames, contact or glass lenses, hearing aids or plugs, artificial knee caps, prosthetic limbs and devices, immobilizing splints, orthopedic inserts, as well as protective equipment such as knee guards, athletic cups, or elbow, chin, and shin guards and other like athletic/protective devices.

Additionally, some embodiments are discussed herein with reference to 3D printed molds of dental arches, and to attaching pre-fabricated attachments to such 3D printed molds of dental arches. However, it should be understood that embodiments also apply to the use of pre-fabricated attachments to attach to and to track other 3D printed objects, which may or may not be unique 3D printed objects, and which may or may not be molds that are used to manufacture other objects.

Figure 1B:
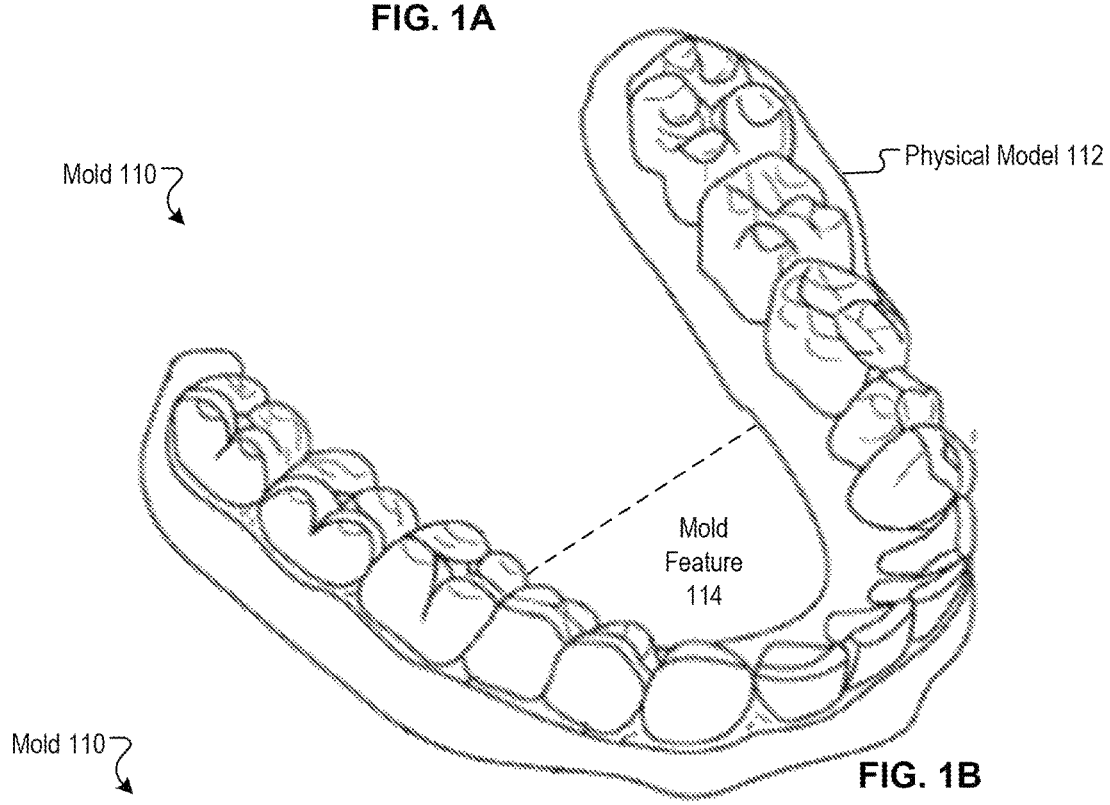
Figure 1C:
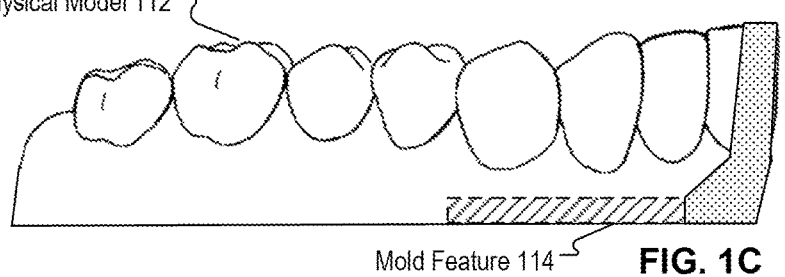

FIGS. 1A-C illustrate views of a mold 110 configured to attach to a pre-fabricated attachment 120, according to certain embodiments. Mold 110 includes a physical model 112 of a dental arch of a patient. An orthodontic aligner is to be formed over the physical model 112. Mold 110 also includes one or more mold features 114. The mold 110 may be modified to include the mold features 114. For example, a mold 110 may include a magnet to attach to a pre-fabricated attachment 120.

Pre-fabricated attachment 120 includes one or more attachment features 122, a traceability component 124, and/or a handling component 126. In some embodiments, one or more portions of pre-fabricated attachment are integral to mold 110. For example, the mold 110 may include the handling component 126.

The one or more attachment features 122 are configured to attach to the one or more mold features 114 (e.g., to attach to the top, bottom, side, etc. of the mold feature 114 and/or mold 110). The pre-fabricated attachment 120 may attach to the mold 110 at any location that is solid enough to move the mold 110 through the manufacturing system and to attach to a plate for thermoforming so that the mold 110 does not rotate or otherwise move. In some embodiments, the one or more attachment features 122 are configured to removably attach to the one or more mold features 114 to allow the pre-fabricated attachment 120 to attach to a first mold, detach from the first mold, and attach to a second mold. Attaching the pre-fabricated attachment 120 to the mold 110 includes one or more of gluing the pre-fabricated attachment 120 to the mold 110, bonding the pre-fabricated attachment 120 to the mold 110, molding the pre-fabricated attachment 120 into the mold 110, mounting the pre-fabricated attachment 120 into the mold 110, inserting a latch of the pre-fabricated attachment 120 into a hole formed by the mold 110, screwing the pre-fabricated attachment 120 into the mold 110, attaching the pre-fabricated attachment 120 to the mold 110 via magnetic attraction, clipping the pre-fabricated attachment 120 to the mold 110, snapping the pre-fabricated attachment 120 to the mold 110, or the like. In some embodiments, the mold feature 114 includes a flattened area forming one or more holes and the attachment feature 122 includes one or more protrusions to attach to the flattened area via the one or more holes.

The traceability component 124 is configured to be used to determine one or more identifiers corresponding to the mold 110. In some embodiments, the one or more identifiers include one or more of a patient identifier (PID), a treatment stage identifier, an upper jaw identifier, or a lower jaw identifier. In some embodiments, the PID, treatment stage identifier, and/or jaw identifier (and/or other identifier) are stored (e.g., encoded) in the traceability component 124. In some embodiments, the traceability component 124 is associated with an attachment identifier (e.g., the attachment identifier is stored or encoded in the traceability component 124) and a database associates the attachment identifier with the PID, treatment stage identifier, and/or jaw identifier (and/or other identifier). The attachment identifier and the database may be used to identify (e.g., track) the mold during production of the orthodontic aligner (or other object). The PID, treatment stage, and/or jaw corresponding to the mold 110 are to be identified during the thermoforming, edge cutting, etc. of the orthodontic aligner based on the traceability component 124. A sensor (e.g., RFID reader, NFC reader) of at least one of a laser cutting machine or a milling machine may read the traceability component 124 responsive to the traceability component 124 being within a threshold distance of the sensor. In some embodiments, the mold 110 is associated with a single identifier that is indicative of two or more of PID, treatment stage, jaw, or the like.

The traceability component 124 may include one or more of an RFID tag, an NFC tag, a data matrix, a barcode, a matrix barcode, a two-dimensional barcode, a three-dimensional barcode, an annotation tag, a digital identifier, an optical identifier, an engraved surface, or the like. An RFID tag may be about 2 to 3 millimeters in width. An RFID tag may store at least 1 kilobyte of data. The RFID tag may be NFC-compatible (e.g., read by a smart phone within a close range). The RFID tag may be resistant to heat, water, and/or chemical reactions. The RFID tag may be reusable. A matrix barcode may be about 5 to 6 millimeters in width.

The handling component 126 is configured to be secured by a robot or person to transport (e.g., move), store in a storage tray, retrieve from a storage tray, etc. the mold 110 and the pre-fabricated attachment 120 (e.g., during production of an orthodontic aligner). The robot or person may secure the handling component 126 without touching the physical model 112 (e.g., avoiding damage of the mold 110).

FIG. 1A illustrates a top view of a system 100 including a mold 110 and a pre-fabricated attachment 120, according to certain embodiments. The mold features 114 may be integral to the mold 110. The mold features 114 may be proximate the lingual side of the teeth in the mold of the dental arch. In some embodiments, the mold features 114 are proximate the front teeth (e.g., incisors, canines) in the mold of the dental arch. In some embodiments, the mold features 114 are proximate the mid-teeth (e.g., premolars, bicuspids) in the mold of the dental arch. In some embodiments, the mold features 114 are proximate the rear teeth (e.g., molars) in the mold of the dental arch.

FIG. 1B illustrates a perspective view of the mold 110 configured to attach to a pre-fabricated attachment 120, according to certain embodiments.

FIG. 1C illustrates a cross-sectional side view of the mold 110 configured to attach to a pre-fabricated attachment 120, according to certain embodiments. The mold features 114 may attach to a portion of the physical model 112 below the gum line (e.g., below the gingival line, below where the gums and the teeth meet) to avoid damaging or otherwise affecting the efficacy of the aligner. A bottom surface of the mold features 114 may be substantially coplanar with a bottom surface of the physical model 112. An upper surface of the mold features 114 may be substantially parallel with the bottom surface of the mold features 114. The upper surface of the mold features 114 may be below the gum line.

In some embodiments, a mold feature 114 may be used as a handling component 126, where a robot or person can secure the mold features 114 to transport (e.g., move) the mold 110 (and pre-fabricated attachment) without touching the physical model to avoid damaging or otherwise affecting the efficacy of the aligner.

Figure 2A:
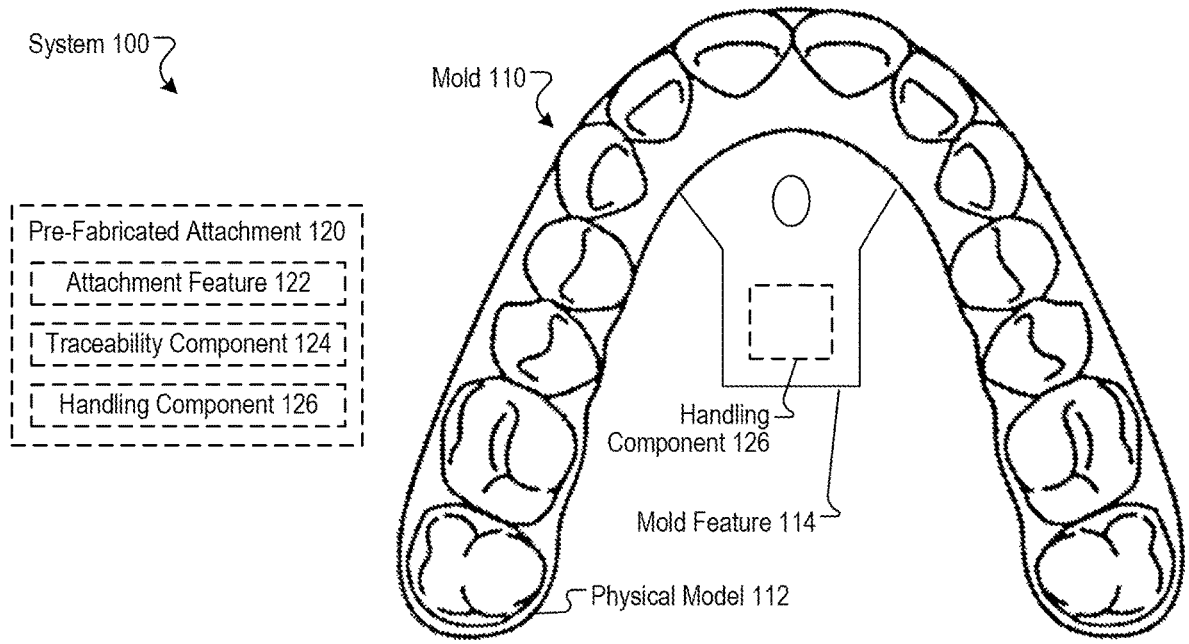
FIGS. 2A-C illustrate views of a mold configured to attach to a pre-fabricated attachment, according to certain embodiments.
Figure 2B:
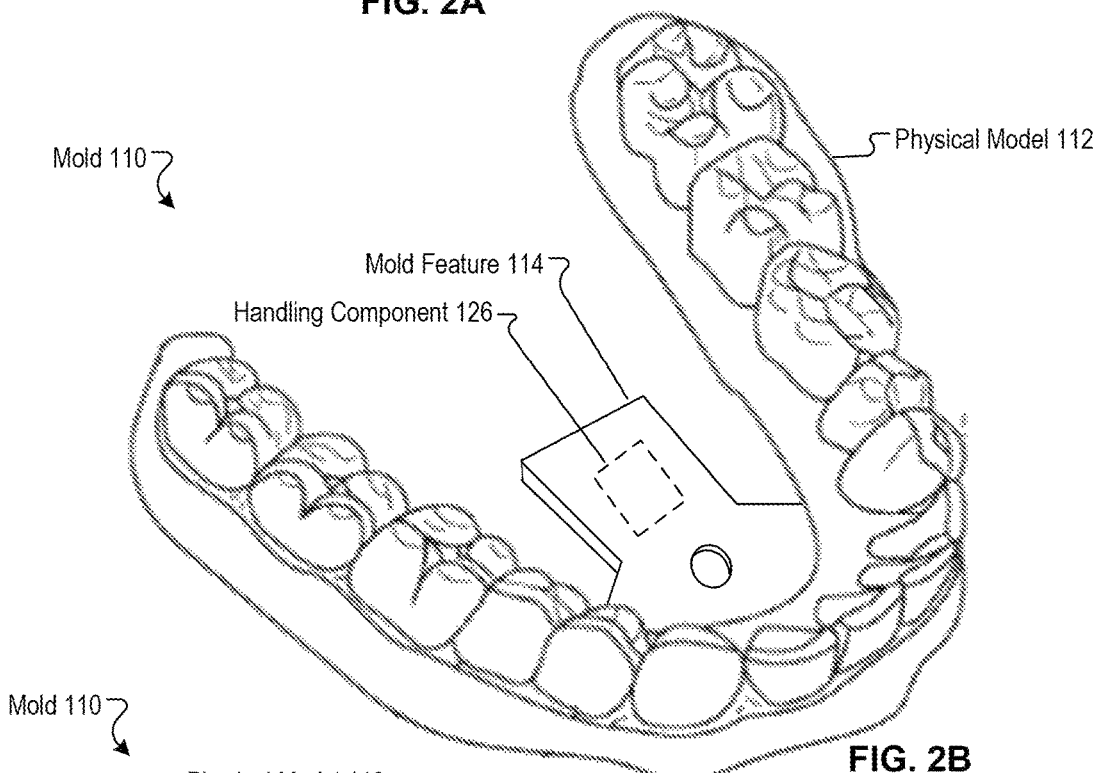
Figure 2C:
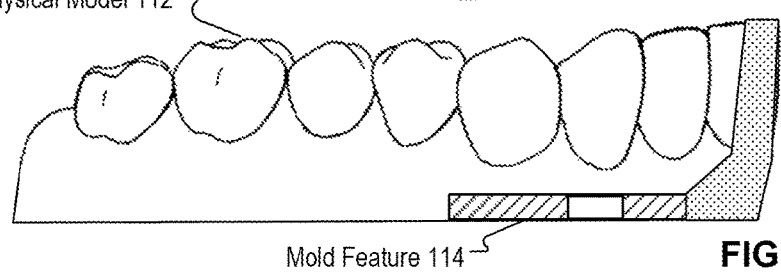

FIGS. 2A-C illustrate views of a mold 110 configured to attach to a pre-fabricated attachment 120, according to certain embodiments. FIG. 2A illustrates a top view of a system 100 including a mold 110 and a pre-fabricated attachment 120, according to certain embodiments. FIG. 2B illustrates a perspective view of a mold 110 configured to attach to a pre-fabricated attachment 120, according to certain embodiments. FIG. 2C illustrates a cross-sectional side view of a mold 110 configured to attach to a pre-fabricated attachment 120, according to certain embodiments. One or more features of FIGS. 2A-C with the same reference numbers as those in one or more of FIGS. 1A-C may have the same or similar functionality and/or structure described in relation to one or more of FIGS. 1A-C.

The mold may include mold feature 114. The mold features 114 may be flattened area that forms a hole to receive the attachment feature 122 of pre-fabricated attachment 120. In some embodiments, the mold 110 may be transported (e.g., moved) by a robot securing a handling component 126 (e.g., tab, grasper) of the mold feature 114 or by a robot securing a handling component 126 of the pre-fabricated attachment.

Figure 2D:
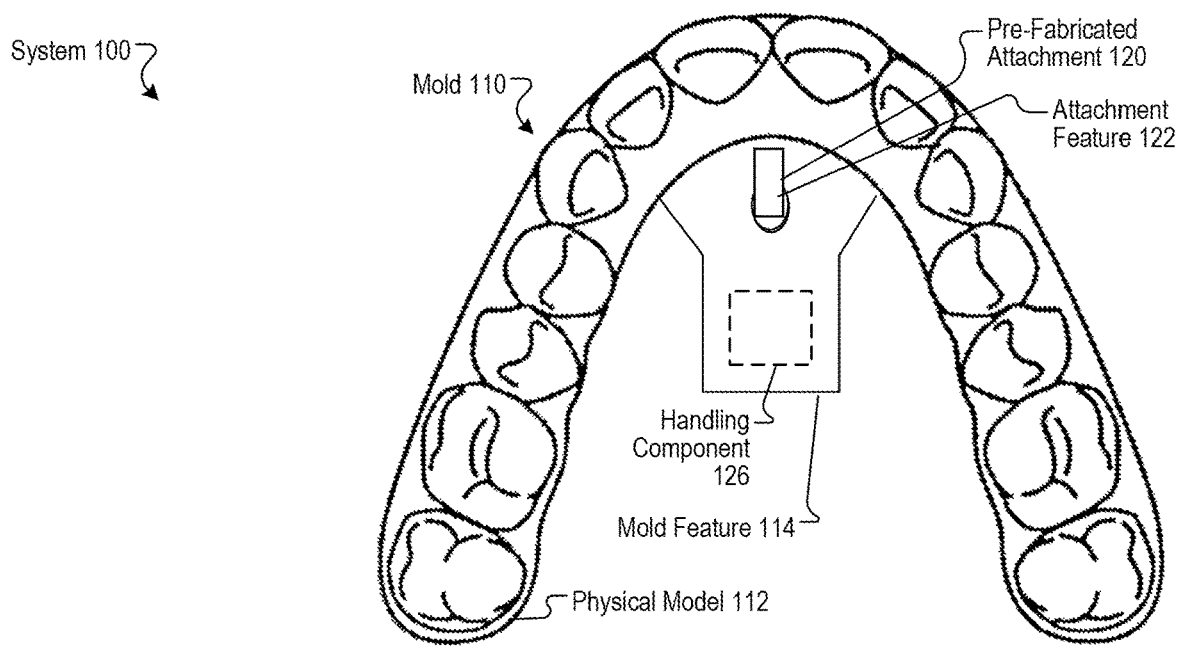
FIGS. 2D-F illustrate views of a mold attached to a pre-fabricated attachment, according to certain embodiments.
Figure 2E:
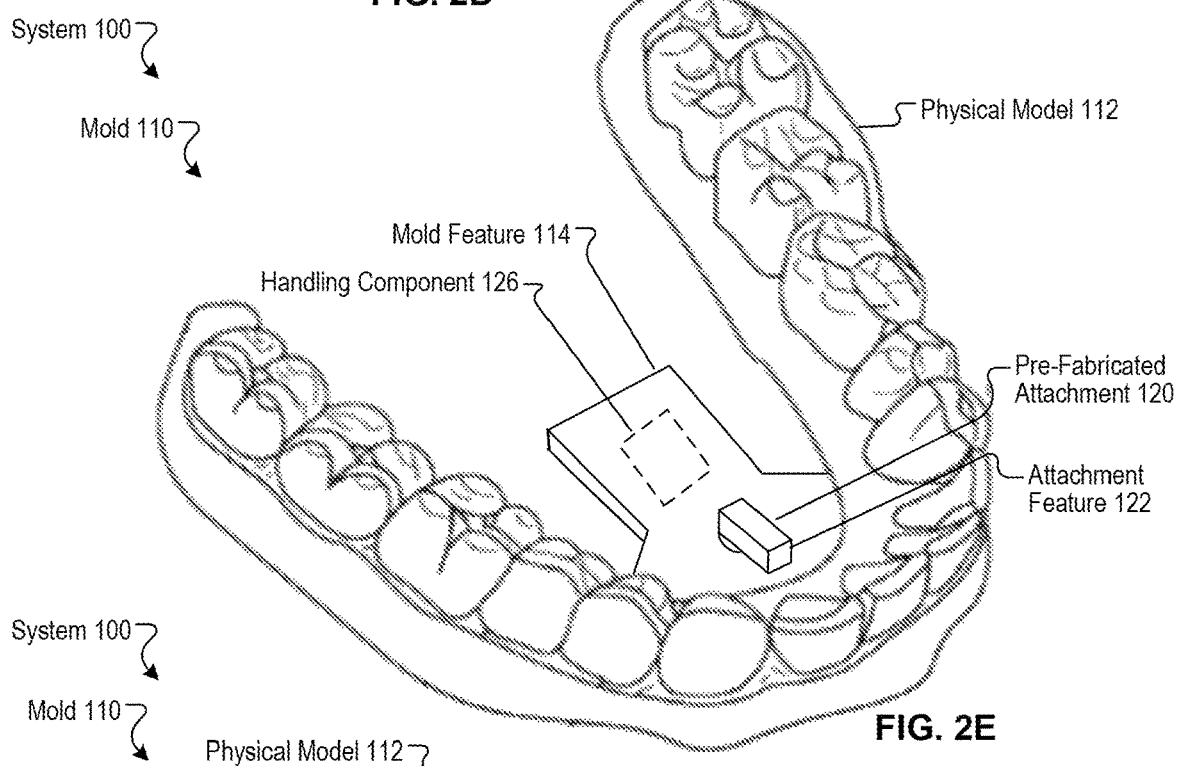
Figure 2F:
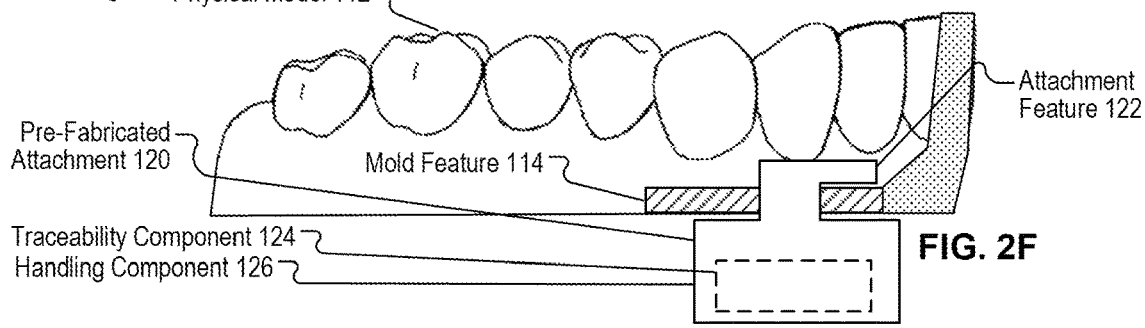

FIGS. 2D-F illustrate views of a system 100 including a mold 110 attached to a pre-fabricated attachment 120, according to certain embodiments. FIG. 2D illustrates a top view of a system 100 including a mold 110 attached to a pre-fabricated attachment 120, according to certain embodiments. FIG. 2E illustrates a perspective view of a system 100 including a mold 110 attached to a pre-fabricated attachment 120, according to certain embodiments. FIG. 2F illustrates a cross-sectional side view of a system 100 including a mold 110 attached to a pre-fabricated attachment 120, according to certain embodiments. One or more features of FIGS. 2D-F with the same reference numbers as those in one or more of FIGS. 1A-2C may have the same or similar functionality and/or structure as those described in relation to one or more of FIGS. 1A-2C.

In some embodiments, the mold feature 114 forms an opening and the attachment feature 122 includes a latch that engages with the mold feature 114 via the opening. The attachment feature 122 may be actuated (e.g., turned, placed in a locked position) manually (e.g., via a user) or automatically (e.g., via a robot) to engage with the mold feature 114 so that the pre-fabricated attachment 120 and mold 110 remain attached during production of an aligner. The attachment feature 122 may be actuated (e.g., turned, placed in an unlocked position) manually (e.g., via a user) or automatically (e.g., via a robot) to disengage with the mold feature 114 (e.g., after production of an aligner, prior to discarding or recycling the mold 110) so that the pre-fabricated attachment 120 becomes detached to be reused with a different mold.

In some embodiments, the traceability component 124 (e.g., RFID or NFC tag) is disposed within the pre-fabricated attachment 120. In some embodiments, the traceability component 124 (e.g., barcode, matrix barcode, RFID tag or NFC tag) is disposed on an outer surface (e.g., side surface) of the pre-fabricated attachment 120.

Figure 2G:
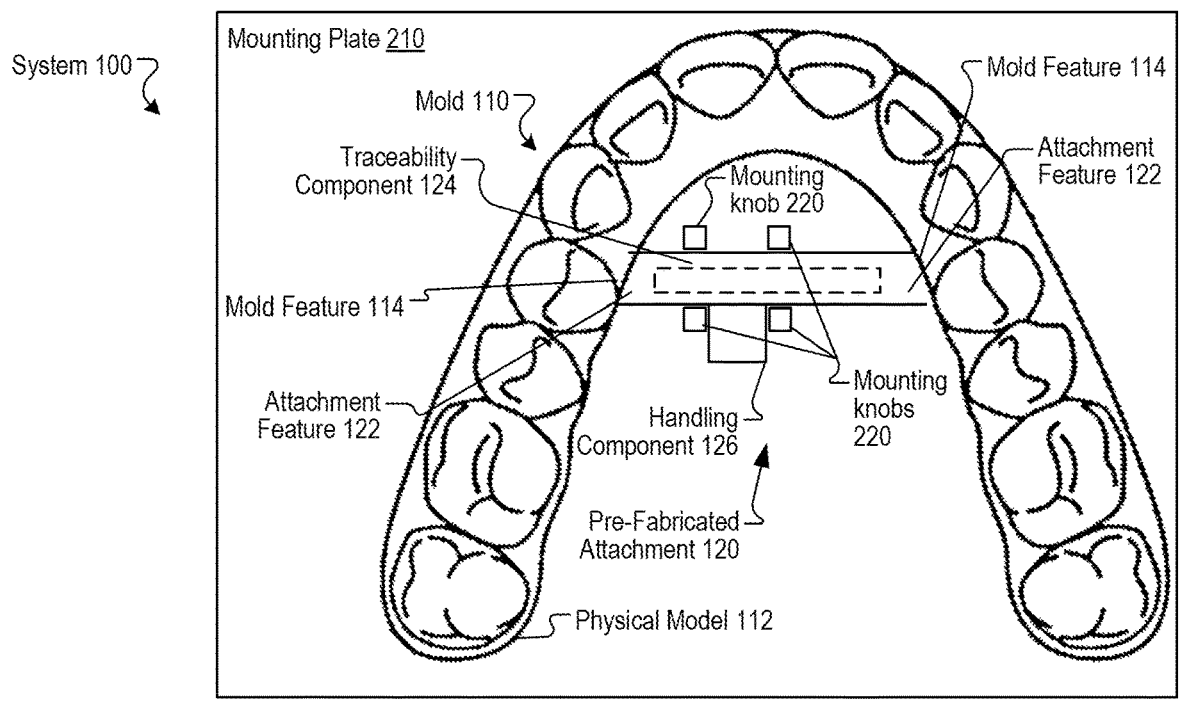
Figure 2H:
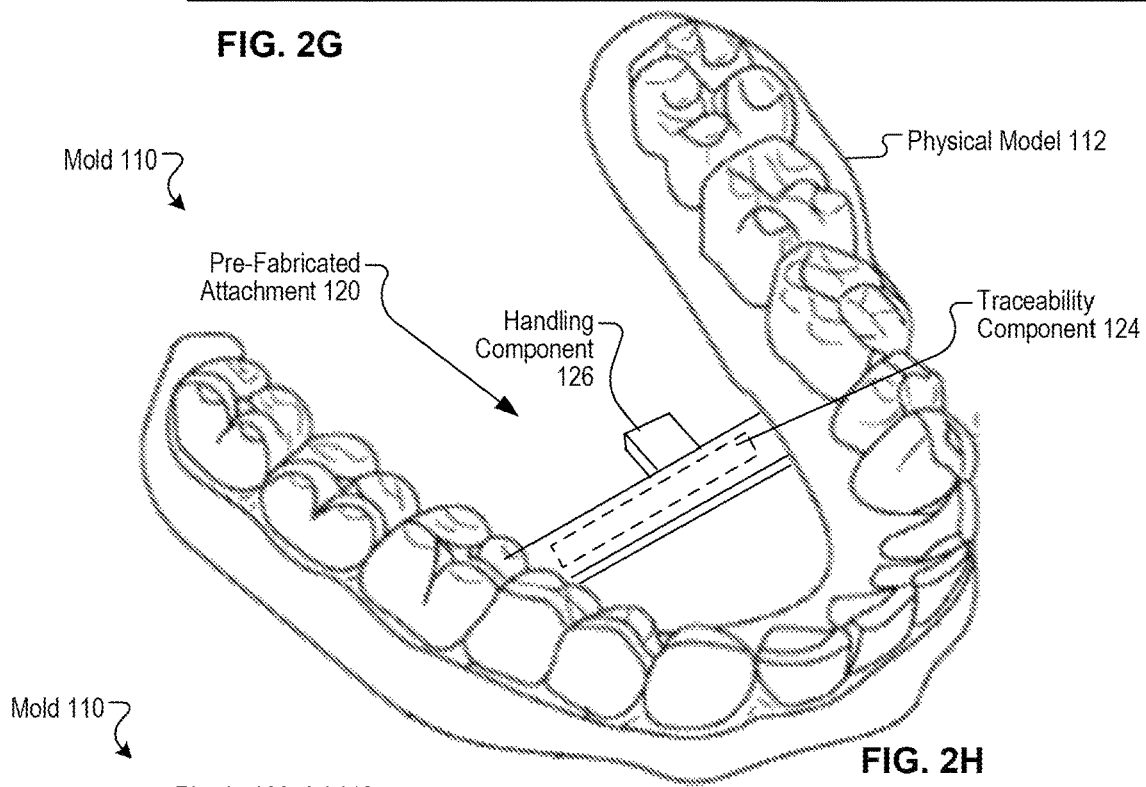
Figure 2I:
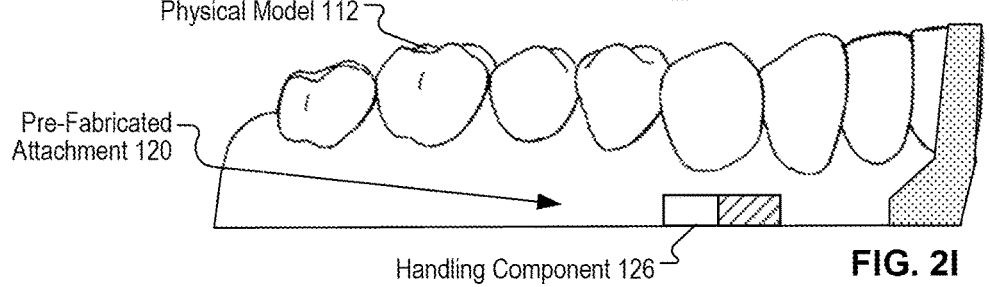

FIGS. 2G-1 illustrate views of a system 100 including a mold 110 attached to a pre-fabricated attachment 120, according to certain embodiments. FIG. 2G illustrates a top view of a system 100 including a mold 110 attached to a pre-fabricated attachment 120, according to certain embodiments. FIG. 2H illustrates a perspective view of a system 100 including a mold 110 attached to a pre-fabricated attachment 120, according to certain embodiments. FIG. 2I illustrates a cross-sectional view of a system 100 including a mold 110 attached to a pre-fabricated attachment 120, according to certain embodiments. One or more features of FIGS. 2G-1 with the same reference numbers as those in one or more of FIGS. 1A-2F may have the same or similar functionality and/or structure as those described in relation to one or more of FIGS. 1A-2F.

The pre-fabricated attachment 120 may include a structure (e.g., beam or bar) that extends from a first lingual portion (e.g., first inside edge of mold, left inner edge, left lingual side of the mold) of the physical model 112 to a second lingual portion (e.g., second inside edge of mold, right inner edge, right lingual side) of the physical model 112. The structure includes the traceability component 124. In some embodiments, the traceability component 124 is an identifier (e.g., alphanumerical identifier) engraved or formed (e.g., punched, channeled from a top surface to a bottom surface) through the structure. In some embodiments, the handling component 126 (e.g., grasper) extends from the traceability component 124 and/or the structure. In some embodiments, the structure is about 15-25 millimeters long. In some embodiments, the handling component 126 is off-centered on the structure (e.g., attached along the first half of the length of the structure).

The mold 110 may be placed on a mounting plate 210 that has mounting knobs 220. The mounting knobs 220 may be configured to secure the mold 110 via the pre-fabricated attachment 120 in the x-direction and the y-direction (e.g., not in a z-direction, the mold 110 and pre-fabricated attachment 120 may be pulled up away from the mounting plate 210). One or more mounting knobs 220 may be disposed between the pre-fabricated attachment 120 and the front teeth. A mounting knob 220 may be disposed proximate the junction between the structure (e.g., bar, traceability component 124) and a first side of the handing component 126. A mounting knob 220 may be disposed proximate the junction between the structure (e.g., bar, traceability component 124) and a second side of the handing component 126.

In some embodiments, the pre-fabricated attachment 120 includes a first attachment feature 122A on a first distal end of the structure (e.g., first distal end of the beam) that attaches to a first mold feature 114A at a first lingual side of the physical model 112 and a second attachment feature 122B on a second distal end of the structure (e.g., second distal end of the beam) that attaches to a second mold feature 114B at a second lingual side of the physical model 112 (e.g., opposite the first mold feature 114A). In some embodiments, the pre-fabricated attachment 120 is integral to the mold 110. In some embodiments, the pre-fabricated attachment 120 is not re-usable (e.g., is discarded or recycled along with the mold 110).

Figure 3:
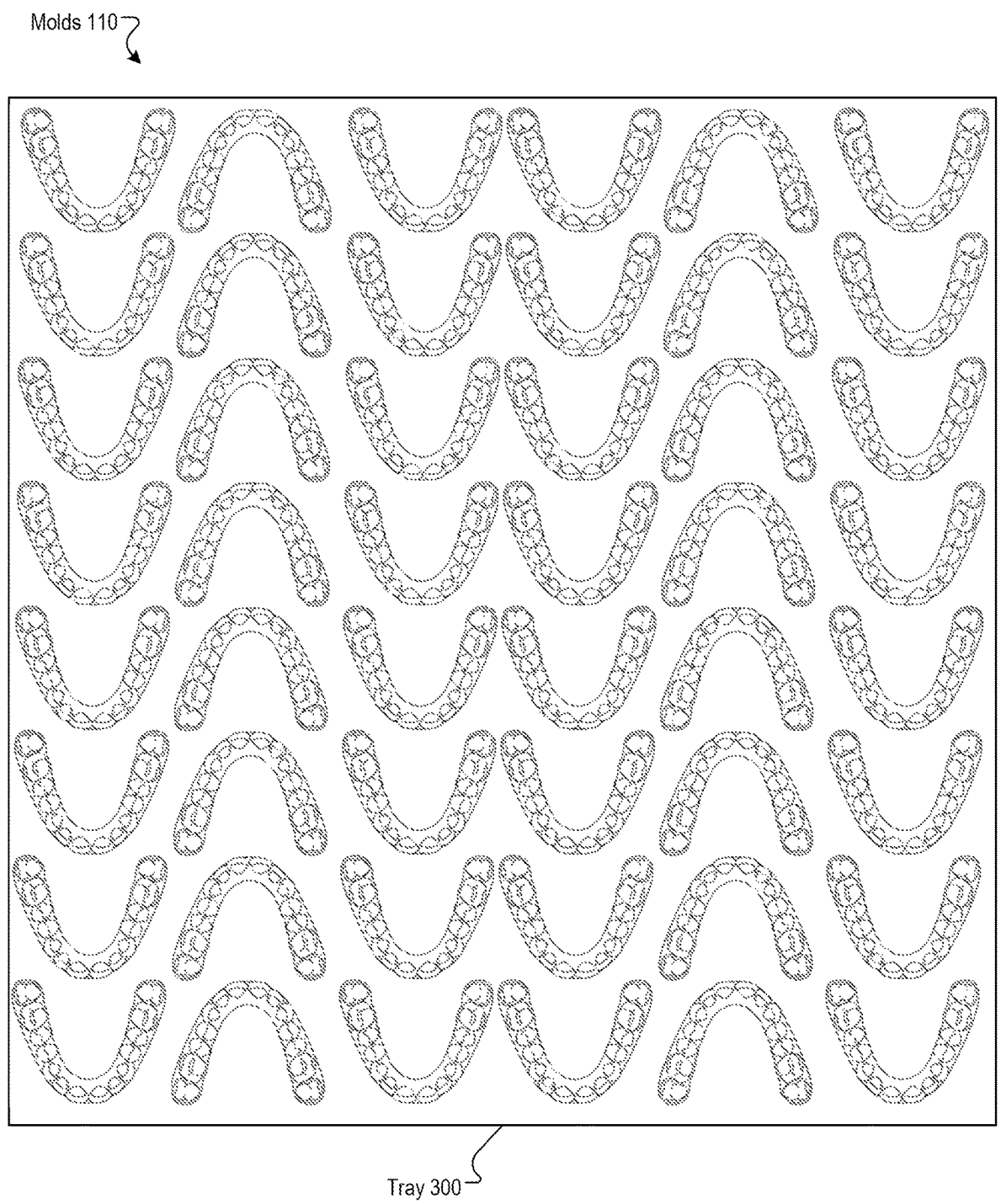
FIG. 3 illustrates a top view of a surface supporting molds configured to attach to pre-fabricated attachments, according to certain embodiments.

FIG. 3 illustrates a top view of a surface (e.g., a stereolithography (SLA) tray 300) supporting molds 110 configured to attach to pre-fabricated attachments 120, according to certain embodiments. In some embodiments, the molds 110 are disposed on the surface and positional information (e.g., matrix location) of each mold 110 is determined based on the corresponding location of each mold 110. The PID, treatment stage, and/or jaw of each mold 110 may be determined based on the positional information. Other arrangements, locations and number of molds on the SLA tray 300 are contemplated. FIG. 3 is one example of many possible configurations.

Figure 4:
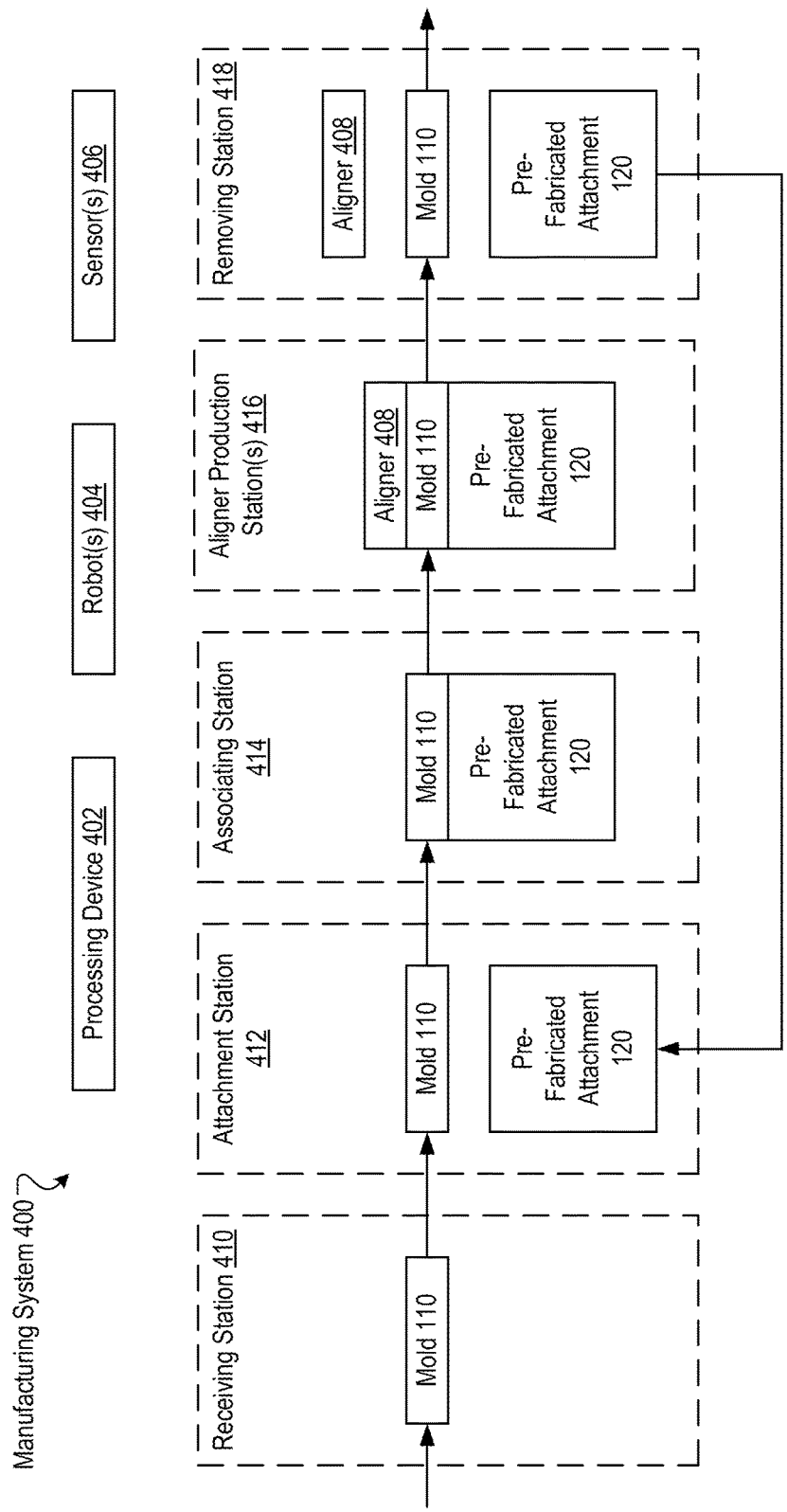
FIG. 4 illustrates a manufacturing system, according to certain embodiments.

FIG. 4 illustrates a manufacturing system 400 (e.g., RFID mold identifier system), according to certain embodiments. The manufacturing system 400 may include a processing device 402 (e.g., controller, server device, local device, etc.), one or more robots 404, and one or more sensors 406. The manufacturing system 400 may include stations including one or more of a receiving station 410, attachment station 412, associating station 414, aligner production stations 416 (e.g., heating, thermoforming, trimming, etc.), and/or removing station 418. One or more of the stations may be at different physical locations (e.g., a mold 110 is transported from a first station to a second station). One or more of the stations may be at the same physical station (e.g., a mold 110 is received, the pre-fabricated attachment 120 is attached to the mold 110, and/or one or more identifiers are associated with the pre-fabricated attachment 120 at substantially the same physical location). In some embodiments, one or more of the stations may be re-ordered (e.g., the one or more identifiers are associated with the pre-fabricated attachment 120 prior to attaching the pre-fabricated attachment 120 to the mold 110) or omitted (e.g., the one or more identifiers are already associated with the pre-fabricated attachment, etc.).

The one or more robots 404 may transport the mold 110 and/or pre-fabricated attachment 120. The one or more sensors 406 may determine the one or more identifiers (e.g., associated with PID, treatment stage, upper or lower jaw) associated with a mold 110 and/or pre-fabricated attachment 120. The processing device 402 may control the robots 404 and receive sensor data from the sensors 406.

At receiving station 410, a mold 110 is identified (e.g., received, produced, etc.). In some embodiments, the mold 110 is identified (e.g., by the processing device) on an SLA tray 300 based on location information (e.g., location of the mold 110 on the SLA tray 300, matrix location on the SLA tray 300).

At attachment station 412, a pre-fabricated attachment 120 is attached to the mold 110. In some embodiments, the pre-fabricated attachment 120 is removably attached to the mold 110 (e.g., via protrusions, holes, latch, magnet, or the like). In some embodiments, the pre-fabricated attachment is permanently attached to (e.g., integral to, bonded to, glued to, adhered to, or the like) the mold 110. In some embodiments, the pre-fabricated attachment 120 is transported (e.g., carried) by a robot 404 to the attachment station 412 and attached to the mold 110 via the robot 404. The robot 404 may transport (e.g., carry) and attach the pre-fabricated attachment 120 by securing a handling component 126 of the pre-fabricated attachment 120. In some embodiments, the mold 110 is removed from the SLA tray 300 prior to attaching the pre-fabricated attachment 120 to the mold 110. In some embodiments, the processing device 402 causes a first robot 404 to secure the mold 110 via a handling component 126 of the mold 110 (e.g., without touching portions of the mold 110 used to make the aligner 408, without touching teeth of the mold 110), causes a second robot 404 to secure the pre-fabricated attachment 120 via a handling component 126 of the pre-fabricated attachment 120, and causes the first and/or second robots 404 to move to attach the pre-fabricated attachment 120 to the mold 110. In some embodiments, the pre-fabricated attachment 120 is attached to the mold 110 subsequent to separation of the mold from a SLA build platform (e.g., SLA tray 300).

The processing device 402 may receive sensor data associated with the traceability component 124 from sensor 406 to determine the PID, treatment stage, and/or jaw corresponding to the mold 110. A user may use a client device to determine the PID, treatment stage, and/or jaw corresponding to the mold 110. A human-readable indication of PID, treatment stage, and/or jaw may be added to any location in the mold 110 (e.g., the bottom of the mold). In some embodiments, the indication of PID, treatment stage, and/or jaw is an engraved surface and/or non-transparent printer material on a surface of the mold 110 and/or pre-fabricated attachment 120.

In some embodiments, the pre-fabricated attachment 120 may be injection molded with a built-in traceability component 124. The pre-fabricated attachment 120 may be configured to latch onto the mold 110 (e.g., using a center hold in the mold 110). The pre-fabricated attachment 120 may have a built-in RFID or a barcode tag to track the mold 110 through the aligner fabrication process.

In some embodiments, prior to producing (e.g., 3D printing) the mold 110, traceability components 124 (e.g., encoded RFID (NFC) tags) are placed on a SLA tray 300 (e.g., 3D printing tray) and affixed to the SLA tray 300 by small magnets in respective positions. Positional information for the traceability components 124 and the information (e.g., PID, treatment stage, jaw) to be encoded in these traceability components 124 may be provided by the processing device 402. The information encoding may be performed by an RFID (e.g., NFC) tag writer device after robot 404 has secured the traceability component 124. Material (e.g., same or similar material that the mold 110 is to be made of) may be placed onto a position under a mold 110 where the traceability component 124 is to be located. The material may encapsulate the traceability component 124. The mold 110 may be removed from the SLA tray 300. The machinery (e.g., laser printing, laser cutting, milling machines) associated with the mold 110 and/or aligner 408 may be coupled to sensors (e.g., RFID (NFC) sensors, similar to NFC card readers) that are configured to read the information in the traceability component 124 (e.g., RFID (NFC) tags) by proximity.

In some embodiments, the traceability component 124 is a barcode (e.g., 3D printed matrix barcode, data matrix, other type of barcode) that is read by an optical reader (e.g., optical matrix barcode reader) for determining the PID, treatment stage, and/or jaw. In some embodiments, the processing device 402 may cause automatic engraving of an identification code onto a non-functional surface (e.g., gingiva) of the mold 110 and may use an optical reader (e.g., optical text reading software) to decipher the information (e.g., PID, treatment stage, jaw).

At associating station 414, the processing device may associate the pre-fabricated attachment 120 with one or more identifiers associated with the mold 110. In some embodiments, the processing device encodes the pre-fabricated attachment 120 with the PID of a patient, a treatment stage, and a jaw associated with the mold 110. In some embodiments, the processing device causes an attachment identifier of the pre-fabricated attachment to be associated with a PID, treatment stage, and/or jaw in a database. The traceability feature (e.g., data matrix, barcode, RFID, etc.) of the traceability component 124 may be tied to the database to enable tracking of a custom 3D printed object (e.g., final product or mold) throughout a manufacturing process.

In some embodiments, first hardware (e.g., dedicated hardware, a client device, a smart phone, an RFID (NFC) writer, etc.) downloads (e.g., writes, encodes) the one or more identifiers (e.g., PID, treatment stage, jaw, etc.) onto the traceability component 124. In some embodiments, second hardware (e.g., dedicated hardware, a client device, a smart phone, an RFID (NFC) reader, sensor, etc.) reads the one or more identifiers (e.g., PID, treatment stage, jaw, etc.)

from the traceability component 124. In some embodiments, the first hardware that performs the downloading is the same as the second hardware that performs the reading. In some embodiments, the first hardware that performs the downloading is different from the second hardware that performs the reading. In some embodiments, multiple sets of hardware perform the reading (e.g., a corresponding sensor 406 at each aligner production station 416, a corresponding sensor 406 on each robot 404).

In some embodiments, the pre-fabricated attachment 120 is integral to the mold 110 and the mold 110 is labeled with the PID, treatment stage number, and/or jaw while being manufactured (e.g., 3D printed). Then, during subsequent operations (e.g., thermoforming and edge cutting of the aligner 408), the mold 110 and aligner 408 are identified by the pre-fabricated attachment 120 to perform the respective PID and/or treatment stage number dependent processing operations. In some embodiments, the pre-fabricated attachment 120 includes a traceability component 124 (e.g., RFID tag, NFC tag, short-distance low-capacity tags) and is attached to the mold 110 after production of the mold 110 (e.g., right after 3D printing). The mold 110 may be identified by a machine (e.g., robots 404, sensors 406) of the manufacturing system 400 and/or by a client device (e.g., smart phone including an RFID (NFC) reader sensor) of a user. The traceability component 124 and/or pre-fabricated attachment 120 meet the size, temperature, and chemical stress constraints of the manufacturing system 400 (e.g., configured to withstand chemical reactions, pressure, and temperature associated with production of the aligner 408). For example, the traceability component 124 and/or pre-fabricated attachment 120 are configured to be used in the chemical reactions, pressure, and temperature of the aligner production stations 416 to identify the PID and treatment stage associated with a first mold. The traceability component 124 and/or pre-fabricated attachment 120 are configured to be re-used in subsequent chemical reactions, pressure, and temperature of the aligner production stations 416 to identify corresponding PID and treatment stage associated with subsequent molds.

At aligner production stations 416, an aligner 408 is produced using the mold 110. The pre-fabricated attachment 120 remains attached to the mold 110 during production of the aligner 408. At each aligner production station 416, the processing device 402 may determine the one or more identifiers (e.g., PID, treatment stage, jaw) associated with the mold 110 via the pre-fabricated attachment 120 and may cause an aligner production operation specific to the one or more identifiers. The aligner production operations may include heating, thermoforming, trimming, edge cutting, or the like. Robots 404 may be used during the aligner production operations. A robot 404 may secure the pre-fabricated attachment 120 and/or mold 110 via a handling component 126 to move the pre-fabricated attachment 120 and mold 110. One or more sensors 406 may be disposed on the robots 404 in manufacturing system 400. For example, a sensor 406 of a laser cutting machine (e.g., laser cutting robot) may read the traceability component 124 responsive to the traceability component 124 being within a threshold distance of the sensor 406. A recipe for laser cutting the aligner that is specific to the particular patient and treatment stage may then be determined, and may be executed by the laser cutting machine. In another example, a sensor 406 of a milling machine (e.g., milling robot) may read the traceability component 124 responsive to the traceability component 124 being within a threshold distance of the sensor 406. In another example, a second sensor 406 of a laser engraving machine may read the traceability component 124 responsive to the traceability component 124 being within a threshold distance of the sensor 406. One or more identifiers may be determined, and the laser engraving machine may then engrave the one or more identifiers in the aligner that was thermoformed over the mold. Thus, when the aligner is separated from the mold the aligner can still be readily identified and tracked throughout the manufacturing process.

At removing station 418, the pre-fabricated attachment 120 is removed from the mold 110. The pre-fabricated attachment 120 may be removed from the mold 110 before, after, or substantially simultaneous with the removal of the aligner 408 from the mold 110. The processing device 402 may cause the pre-fabricated attachment 120 to be removed from the mold 110 by using one or more robots 404 securing one or more handling components 126. Subsequent to removal of the pre-fabricated attachment 120 from the mold 110, the mold 110 may be saved, stored, discarded, or recycled and the pre-fabricated attachment 120 may be transported (e.g., taken) (e.g., by a robot 404 controlled by processing device 402) to attachment station 412 to be used with a different mold.

In some embodiments, one or more components of the manufacturing system 400 may be transported (e.g., carried) via one or more of a conveyor system, holding pins, a pallet, a lifting device, a plate, or the like.

In some embodiments, manufacturing system 400 may be used for production of objects other than aligners 408. For example, manufacturing system 400 may be used to produce custom objects (e.g., dental aligner, palatal expander, hearing aid, shoe sole, etc.) that can be directly 3D printed or fabricated using a 3D printed mold as an intermediate or sacrificial step in a production process. By introducing a pre-fabricated object (e.g., pre-fabricated attachment 120) to be attached to a 3D printed custom object and/or mold, traceability and handling of the custom objects is simplified. While size and shape of the custom object may vary, the pre-fabricated attachment 120 can have a fixed feature for handling, pick and placement, storage, and sorting. The manufacturing system 400 may be used for production in a custom manufacturing scenario when a 3D printed part is to be used as a component in an automated control manufacturing line (ACL) and the identification of the component is to be used in subsequent operations. The manufacturing system 400 may use traceability components 124 (e.g., RFIDs) in manufacturing lines for automatic identification of parts.

Figure 5A:
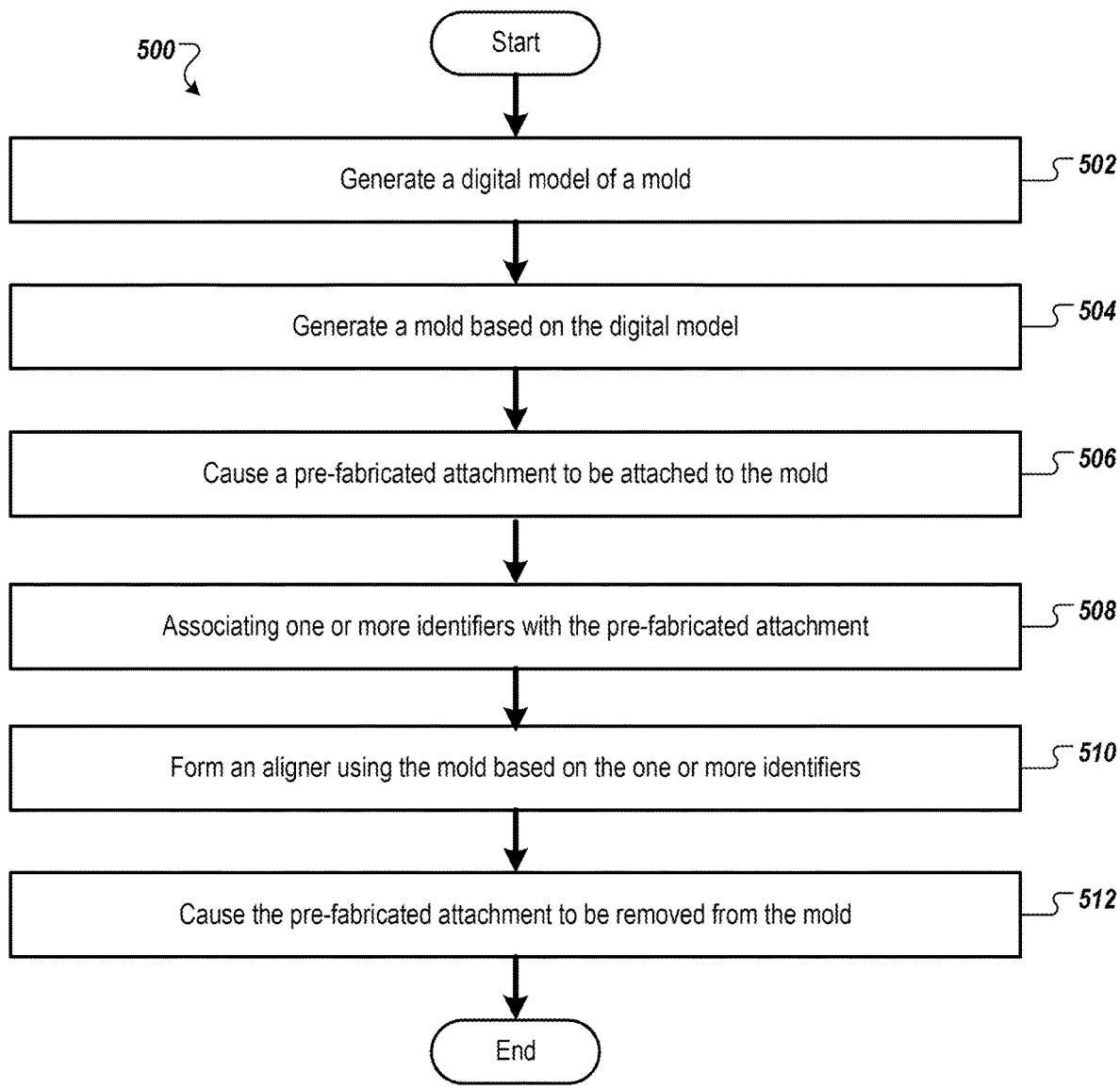
FIGS. 5A-B illustrate flow diagrams for methods associated with production of aligners, according to certain embodiments.
Figure 5B:
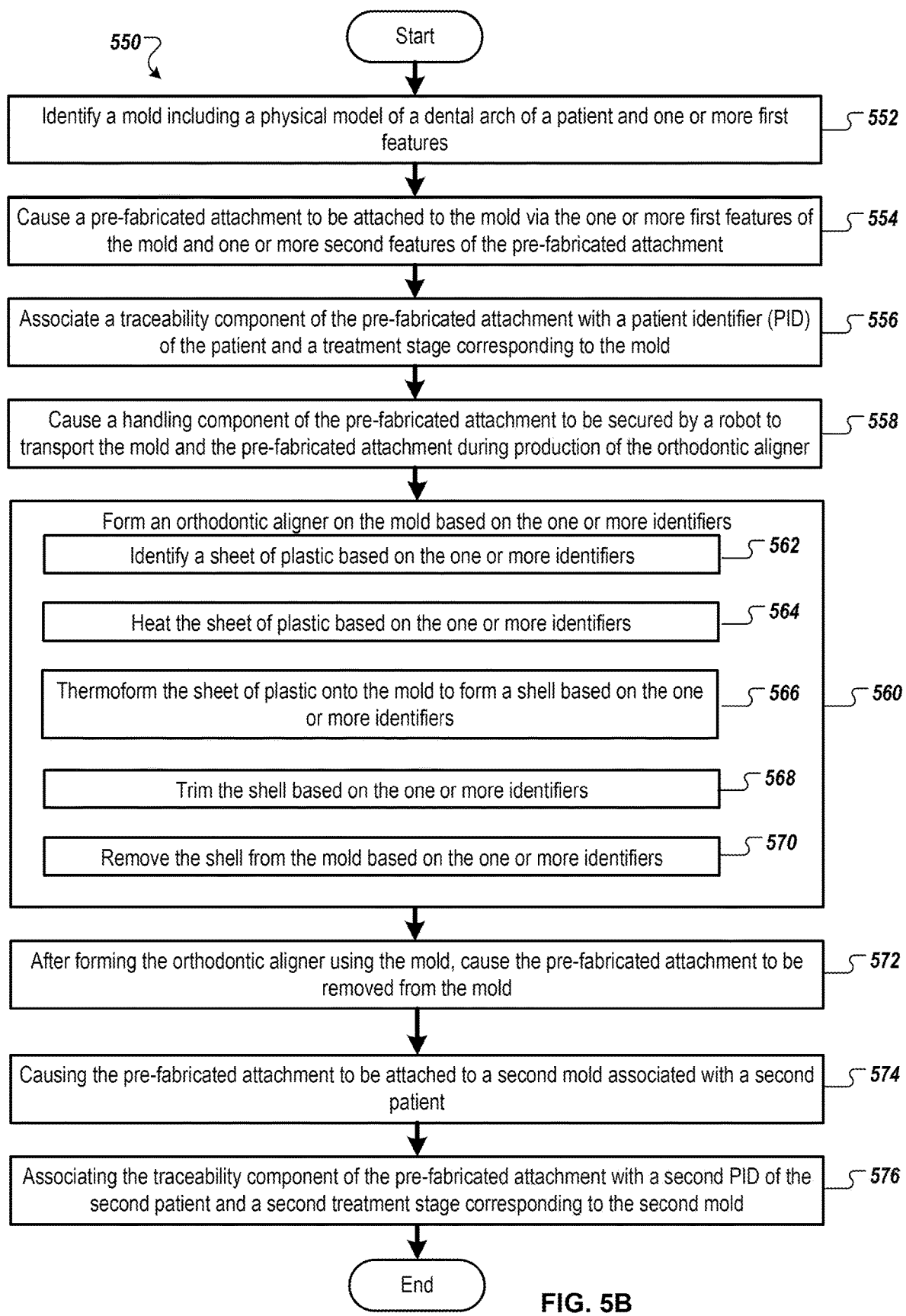

FIGS. 5A-B illustrate flow diagrams for methods 500 and 550 associated with production of aligners, according to certain embodiments. In some embodiments, one or more operations of methods 500 and 550 are performed by a processing logic of a computing device to automate one or more operations associated with production of an aligner (or 3D printed object or other object formed using a 3D printed object) and/or identifying a mold. The processing logic may include hardware (e.g., circuitry, dedicated logic, programmable logic, microcode, etc.), software (e.g., instructions executed by a processing device), firmware, or a combination thereof. For example, one or more operations of method 500 and 550 may be performed by a processing device executing a program or module, such as aligner generator 650 of FIG. 6.

Referring to FIG. 5A, at block 502 of method 500, a digital model of a mold is generated. A shape of a dental arch for a patient at treatment stage may be determined based on a treatment plan to generate the digital model of the mold.

In the example of orthodontics, the treatment plan may be generated based on an intraoral scan of a dental arch to be modeled. The intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold (e.g., dental impression) may be generated from an actual object (e.g., dental arch with at least one tooth) to be modeled. The negative mold (e.g. dental impression) or positive model produced therefrom (e.g., plaster dental model) may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the mold that will cause the aligner formed over the mold to have the determined markings and/or elements.

The processing logic may determine a final shape for the mold and may generate a digital model of the mold. Alternatively, the digital model may have already been generated. In such an instance, processing logic updates the already generated digital model to include the determined features for the mold. The digital model may be represented in a file such as a computer aided design (CAD) file or a 3D printable file such as a stereolithography (STL) file. The digital model may include instructions that will control a fabrication system or device in order to produce the mold with specified geometries.

At block 504, a mold is generated based on the digital model. Each virtual 3D model of a patient's dental arch may be used to generate a unique customized mold of the dental arch at a particular stage of treatment. The shape of the mold may be at least in part based on the shape of the virtual 3D model for that treatment stage. The mold may be formed using a rapid prototyping equipment (e.g., 3D printers) to manufacture the mold using additive manufacturing techniques (e.g., stereolithography), subtractive manufacturing techniques (e.g., milling), or similar manufacturing techniques. The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, SLA, also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., complex features added to the mold) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

At block 506, a pre-fabricated attachment is caused to be attached to the mold. The pre-fabricated attachment and the mold may have corresponding mating features configured to allow attachment of the pre-fabricated attachment to the mold. In some embodiments, the pre-fabricated attachment is removably attached to the mold. In some embodiments, the pre-fabricated attachment is permanently attached to the mold.

At block 506, one or more identifiers are associated with the pre-fabricated attachment. The one or more identifiers may be associated with one or more of PID, treatment stage, jaw, or the like.

At block 510, an aligner is formed using the mold based on the one or more identifiers. Aligners may be formed from each mold to provide forces to move the patient's teeth. The shape of each aligner is unique and customized for a specific patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities (e.g., indentations) that receive and resiliently reposition the teeth in accordance with a particular treatment stage. A shell is formed over the mold. In one embodiment, a sheet of material is pressure formed or thermoformed over the mold. The sheet may be, for example, a sheet of plastic (e.g., an elastic thermoplastic, a sheet of polymeric material, etc.). To thermoform the shell over the mold, the sheet of material may be heated to a temperature at which the sheet becomes pliable. Pressure may concurrently be applied to the sheet to form the now pliable sheet around the mold with the features that will imprint the markings and/or elements in the aligner. Once the sheet cools, it will have a shape that conforms to the mold. In one embodiment, a release agent (e.g., a non-stick material) is applied to the mold before forming the shell. This may facilitate later removal of the mold from the shell.

The shell may be trimmed before or after it is removed from the mold to generate an aligner. In some embodiments, the portion of the shell that is disposed on a portion of the mold that slopes outward below the gum line is removed during the trimming of the shell to generate the aligner. Before or after the shell is removed from the mold for a treatment stage, the shell is subsequently trimmed along one or more cut lines (also referred to as a trim line). The cut line may be a gingival cut line that represents an interface between an aligner and a patient's gingiva. In one embodiment, the aligner is manually cut by a technician using scissors, a bur, a cutting wheel, a scalpel, or any other cutting implement. In another embodiment, the aligner is cut by a computer controlled trimming machine such as a CNC machine or a laser trimming machine. The computer controlled trimming machine may control an angle and position of a cutting tool of the trimming machine to trim the shell.

A traceability component of the pre-fabricated attachment may be scanned by a sensor in order to determine the identifier(s) associated with the pre-fabricated attachment, and a trimming recipe may be determined based on the identifiers. The trimming recipe may be used by the computer controlled trimming machine to trim the aligner, where the recipe may be unique to the particular aligner (e.g., may be unique to a particular patient and treatment stage).

At block 512, the pre-fabricated attachment is removed from the mold. The pre-fabricated attachment may be reused for subsequent molds that are different from the mold of blocks 502-506.

Referring to FIG. 5B, one or more operations of method 550 may be performed by processing logic (e.g., processing device 402). One or more operations or method 550 may be caused by processing logic (e.g., processing device 402) and may be performed manually (e.g., processing logic provides instructions for manual operation of one or more blocks of method 550).

At block 552 of method 550, a mold is identified (e.g., by processing device 402). The model includes a physical model of a dental arch of a patient and one or more mold features.

At block 554, a pre-fabricated attachment is caused to be attached to the mold. The pre-fabricated attachment may include one or more attachment features. The pre-fabricated attachment is attached to the mold via the one or more mold features and the one or more attachment features. For example, the mold features may include a flattened region that forms a hole and the pre-fabricated attachment may include a protrusion configured to couple with the flattened region via the hole. The processing logic may cause the pre-fabricated attachment to be attached to the mold using one or more robots (e.g., a first robot securing the pre-fabricated attachment, a second robot securing the mold, etc.). In some embodiments, the processing logic may provide an indication (e.g., instructions) that the pre-fabricated attachment is to be manually attached to the mold.

At block 556, a traceability component of the pre-fabricated attachment is associated with one or more identifiers (e.g., associated with PID, treatment stage, upper or lower jaw, or the like). In some embodiments, the processing logic encodes the traceability component with the one or more identifiers. During production of an aligner, the one or more identifiers may be read from the traceability component. In some embodiments, the traceability component has an attachment identifier and the processing logic associates the attachment identifier with the one or more identifiers in a database. During production of an aligner, the processing logic may read the attachment identifier from the traceability component and the processing logic may determine the one or more identifiers associated with the mold from the database based on the attachment identifier. In some embodiments, the one or more identifiers of the traceability component are associated with (e.g., are indicative of, are used to identify in a database, etc.) one or more of the virtual 3D model of the dental arch at a particular treatment stage, a virtual 3D model of the appliance to be formed over the dental arch, or the like. In some embodiments, the one or more identifiers of the traceability component are associated with (e.g., are indicative of, are used to identify in a database, etc.) one or more aligner production operations (e.g., trimming operation, etc.).

In some embodiments, the one or more identifiers include a PID of the patient and a treatment stage identifier corresponding to the mold and the one or more identifiers are stored in the traceability component. In some embodiments, an attachment identifier is stored in the traceability component and a database associates the attachment identifier with the PID and the treatment stage. The attachment identifier and the database are to be used to identify one or more production operations corresponding to the PID and the treatment stage during production of the orthodontic aligner.

At block 558, a handling component of the pre-fabricated attachment is caused to be secured by a robot. In some embodiments, a handling component of the mold is caused to be secured by a robot. In some embodiments, processing logic may cause the one or more robots to move the mold attached to the pre-fabricated attachment through the different aligner production operations.

At block 560, an orthodontic aligner is formed on the mold based on one or more identifiers associated with the pre-fabricated attachment. Block 560 may include one or more of blocks 562-570.

At block 562, sheet of plastic is identified. The sheet of plastic may be loaded onto a pallet via one or more holding pins of the pallet (e.g., puncturing the sheet of plastic with the holding pins at a loading station of an aligner manufacturing system). The pallet may be on a conveyor system. The sheet of plastic may be identified based on one or more of the identifiers associated with the pre-fabricated attachment. For example, the PID may indicate a size or type of a sheet of plastic. The treatment stage may indicate a type of sheet of plastic (e.g., thickness, material). The upper or lower jaw may indicate the type of sheet of plastic.

At block 564, the sheet of plastic is heated (e.g., via a heater including a mask in a heating section of an aligner manufacturing system). The sheet of plastic may be heated while disposed on the pallet that is on the conveyor system. The sheet of plastic may be heated based on one or more of the identifiers associated with the pre-fabricated attachment. For example, one or more of the temperature, the cooling, the ramp up, ramp down, or the like may be determined based on one or more of the identifiers.

At block 566, the sheet of plastic is thermoformed onto the mold to form a shell disposed on the mold (e.g., via a pressure device in a thermoforming chamber of the aligner manufacturing system). The plastic sheet may be thermoformed while disposed on the pallet that is on the conveyor system. A mold may be disposed on a plate on a lifting device. The lifting device may lift the mold to interface with the sheet of plastic in the thermoforming chamber to form the shell disposed on the mold. The sheet of plastic may be thermoformed based on one or more of the identifiers associated with the pre-fabricated attachment. For example, one or more of the pressure, speed of lifting the mold, temperature, or the like may be determined based on one or more of the identifiers.

At block 568, the shell is trimmed. The shell may be trimmed above the gingival line of the mold. The shell may be trimmed based on one or more of the identifiers associated with the pre-fabricated attachment. For example, one or more of the cut line, the trim height, or the like may be determined based on one or more of the identifiers.

At block 570, the shell is removed from the mold. The shell may be removed based on one or more of the identifiers associated with the pre-fabricated attachment. For example, one or more of the tools used to remove, the speed of removal, whether the removal is before the trimming, whether the removal is before the removal of the pre-fabricated attachment, or the like may be determined based on one or more of the identifiers.

At block 572, the pre-fabricated attachment is removed (e.g., caused to be automatically removed by a robot, caused to be manually removed by a person) from the mold after forming of the orthodontic aligner using the mold. The processing logic may cause the pre-fabricated attachment to be removed using one or more robots (e.g., a first robot securing the pre-fabricated attachment, a second robot securing the mold, etc.). In some embodiments, the processing logic may provide an indication (e.g., instructions) that the pre-fabricated attachment is to be manually removed from the mold.

At block 574, the pre-fabricated attachment is attached (e.g., caused to be automatically attached by a robot, caused to be manually attached by a person) to a second mold. Block 574 may be similar to block 554. The second mold may be associated with a different patient, a different treatment stage, and/or a different jaw than the mold of block 554.

At block 576, the traceability component is associated with one or more second identifiers of the second patient. Block 576 may be similar to 556.

Figure 6:
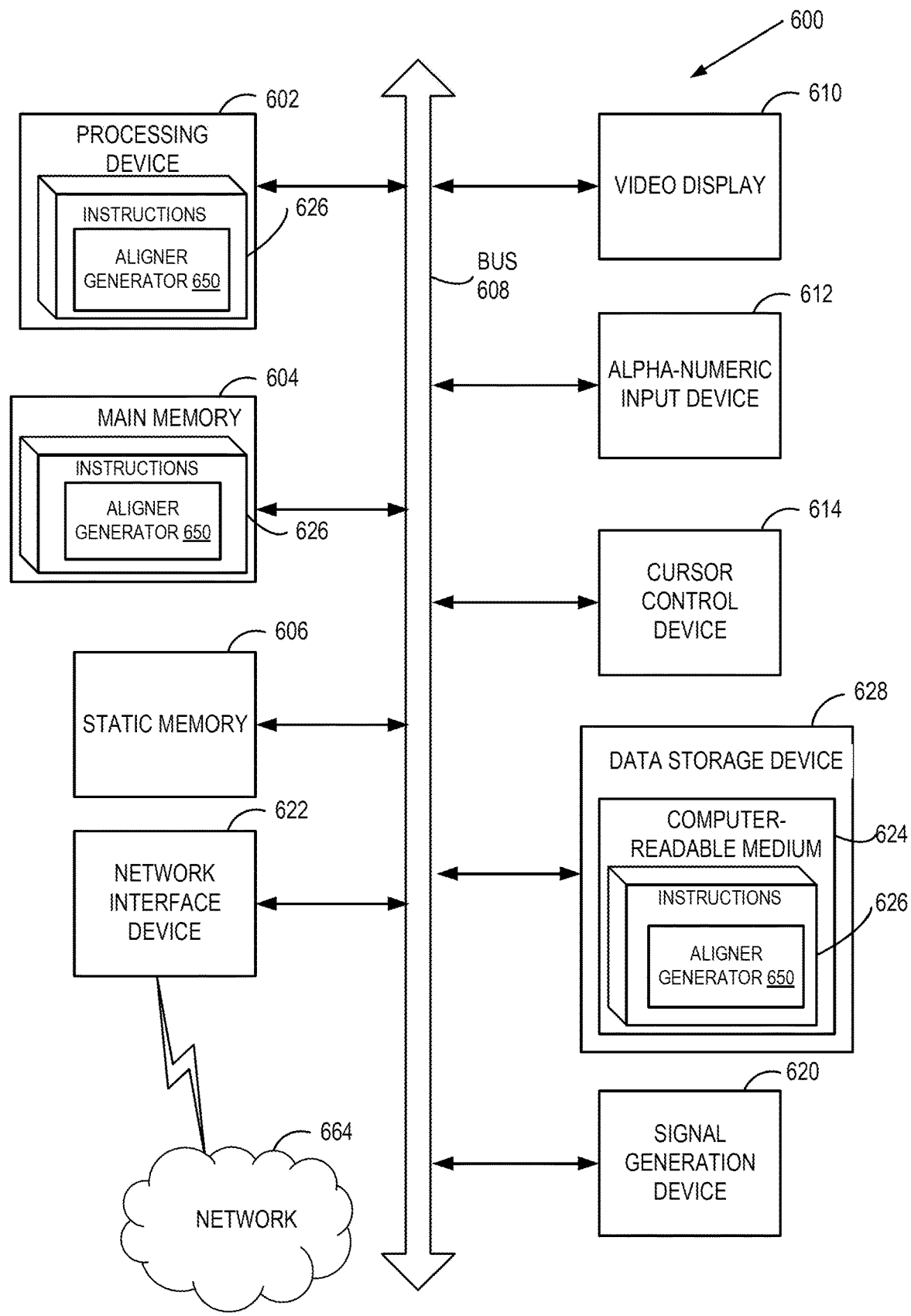
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methodologies discussed with reference to the methods of FIGS. 5A-B. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for aligner production, model identification, and/or an aligner generator 650, which may perform one or more of the operations of methods 500 and 550 described with reference to FIGS. 5A-B. The computer-readable storage medium 624 may also store a software library containing methods that call an aligner generator 650. While the computer-readable storage medium 624 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing or encoding a set of instructions for execution by the machine and that cause the machine to perform any one or more of the methodologies of the present disclosure. The term "non-transitory computer-readable storage medium" shall accordingly be taken to include, but not be limited to, solid-state memories, and optical and magnetic media.

Figure 7A:
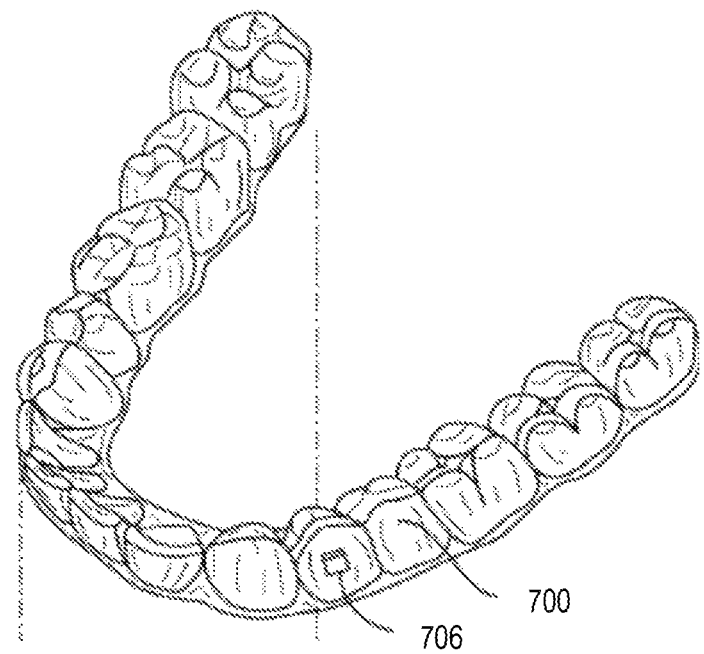
FIG. 7A illustrates a tooth repositioning appliance, according to certain embodiments.
Figure 7A:
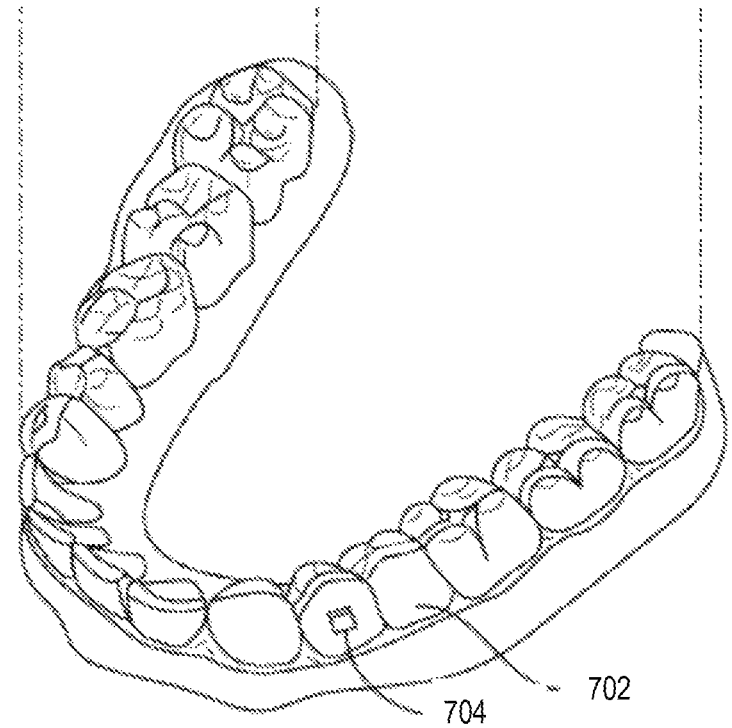

FIG. 7A illustrates a tooth repositioning appliance or aligner 700, according to certain embodiments. The aligner 700 can be worn by a patient in order to achieve an incremental repositioning of individual teeth 702 in the jaw. The aligner 700 may be produced using a mold attached to a pre-fabricated attachment 120, as described herein. The appliance can include a shell (e.g., a continuous polymeric shell or a segmented shell) having teeth-receiving cavities (e.g., indentations) that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly(vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following Provisional patent applications filed by Align Technology: "MULTI-MATERIAL ALIGNERS," U.S. Prov. App. Ser. No. 62/189,259, filed Jul. 7, 2015; "DIRECT FABRICATION OF ALIGNERS WITH INTERPROXIMAL FORCE COUPLING", U.S. Prov. App. Ser. No. 62/189,263, filed Jul. 7, 2015; "DIRECT FABRICATION OF ORTHODONTIC APPLIANCES WITH VARIABLE PROPERTIES," US Prov. App. Ser. No. 62/189,291, filed Jul. 7, 2015; "DIRECT FABRICATION OF ALIGNERS FOR ARCH EXPANSION", U.S. Prov. App. Ser. No. 62/189,271, filed Jul. 7, 2015; "DIRECT FABRICATION OF ATTACHMENT TEMPLATES WITH ADHESIVE," U.S. Prov. App. Ser. No. 62/189,282, filed Jul. 7, 2015; "DIRECT FABRICATION CROSS-LINKING FOR PALATE EXPANSION AND OTHER APPLICATIONS", U.S. Prov. App. Ser. No. 62/189,301, filed Jul. 7, 2015; "SYSTEMS, APPARATUSES AND METHODS FOR DENTAL APPLIANCES WITH INTEGRALLY FORMED FEATURES", U.S. Prov. App. Ser. No. 62/189,312, filed Jul. 7, 2015; "DIRECT FABRICATION OF POWER ARMS", U.S. Prov. App. Ser. No. 62/189,317, filed Jul. 7, 2015; "SYSTEMS, APPARATUSES AND METHODS FOR DRUG DELIVERY FROM DENTAL APPLIANCES WITH INTEGRALLY FORMED RESERVOIRS", U.S. Prov. App. Ser. No. 62/189,303, filed Jul. 7, 2015; "DENTAL APPLIANCE HAVING ORNAMENTAL DESIGN", U.S. Prov. App. Ser. No. 62/189,318, filed Jul. 7, 2015; "DENTAL MATERIALS USING THERMOSET POLYMERS," U.S. Prov. App. Ser. No. 62/189,380, filed Jul. 7, 2015; "CURABLE COMPOSITION FOR USE IN A HIGH TEMPERATURE LITHOGRAPHY-BASED PHOTOPOLYMERIZATION PROCESS AND METHOD OF PRODUCING CROSSLINKED POLYMERS THEREFROM," U.S. Prov. App. Ser. No. 62/667,354, filed May 4, 2018; "POLYMERIZABLE MONOMERS AND METHOD OF POLYMERIZING THE SAME," U.S. Prov. App. Ser. No. 62/667,364, filed May 4, 2018; and any conversion applications thereof (including publications and issued patents), including any divisional, continuation, or continuation-in-part thereof.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform automated removal from a mold of any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities (e.g., indentations) matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the aligner 700 (e.g., appliance) so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
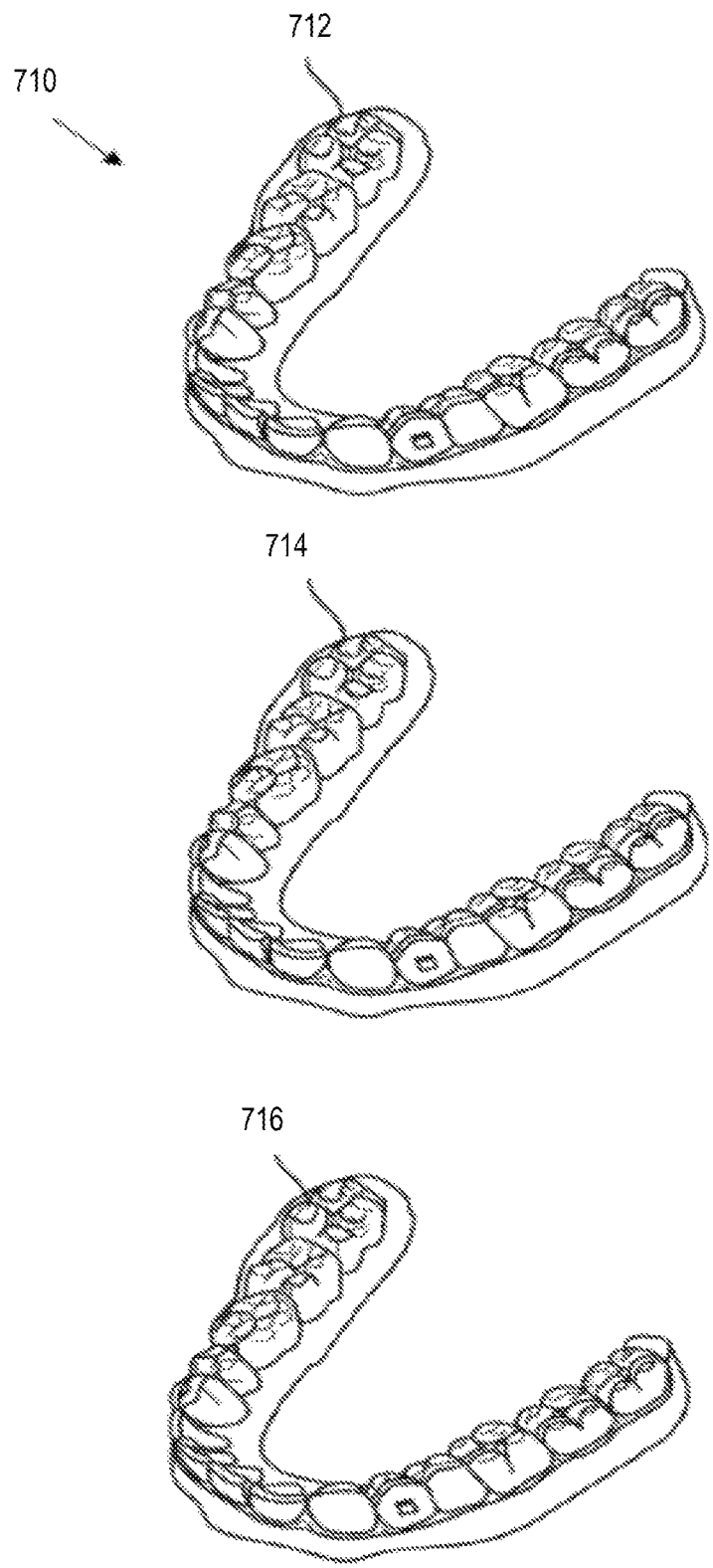
FIG. 7B illustrates a tooth repositioning system, according to certain embodiments.

FIG. 7B illustrates a tooth repositioning system 710, according to certain embodiments. The tooth repositioning system 710 includes a plurality of appliances 712, 714, 716. The appliances 712, 714, 716 may be produced using molds attached to a corresponding pre-fabricated attachment 120, as described herein. Any of the appliances described herein can be designed and/or provided as part of a set of a plurality of appliances used in a tooth repositioning system. Each appliance may be configured so a tooth-receiving cavity (e.g., indentation) has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing an aligner generator 650.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided design (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities (e.g., indentations) that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on one or more of the virtual 3D model of the dental arch at a particular treatment stage, based on a virtual 3D model of the appliance to be formed over the dental arch, and/or based on one or more identifiers received from the traceability component 124 of the pre-fabricated attachment 120. In some embodiments, the one or more identifiers of the traceability component 124 are associated with (e.g., are indicative of, are used to identify in a database, etc.) one or more of the virtual 3D model of the dental arch at a particular treatment stage, a virtual 3D model of the appliance to be formed over the dental arch, or the like. In some embodiments, the one or more identifiers of the traceability component 124 are associated with (e.g., are indicative of, are used to identify in a database, etc.) one or more aligner production operations (e.g., trimming operation, etc.). The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

Figure 7C:
FIG. 7C illustrates a method of orthodontic treatment using a plurality of appliances, according to certain embodiments.
Figure 7C:

FIG. 7C illustrates a method 750 of orthodontic treatment using a plurality of appliances, according to certain embodiments. The method 750 can be practiced using any of the appliances or appliance sets described herein (e.g., produced using a mold 110 attached to a pre-fabrication attachment 120). In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 8:
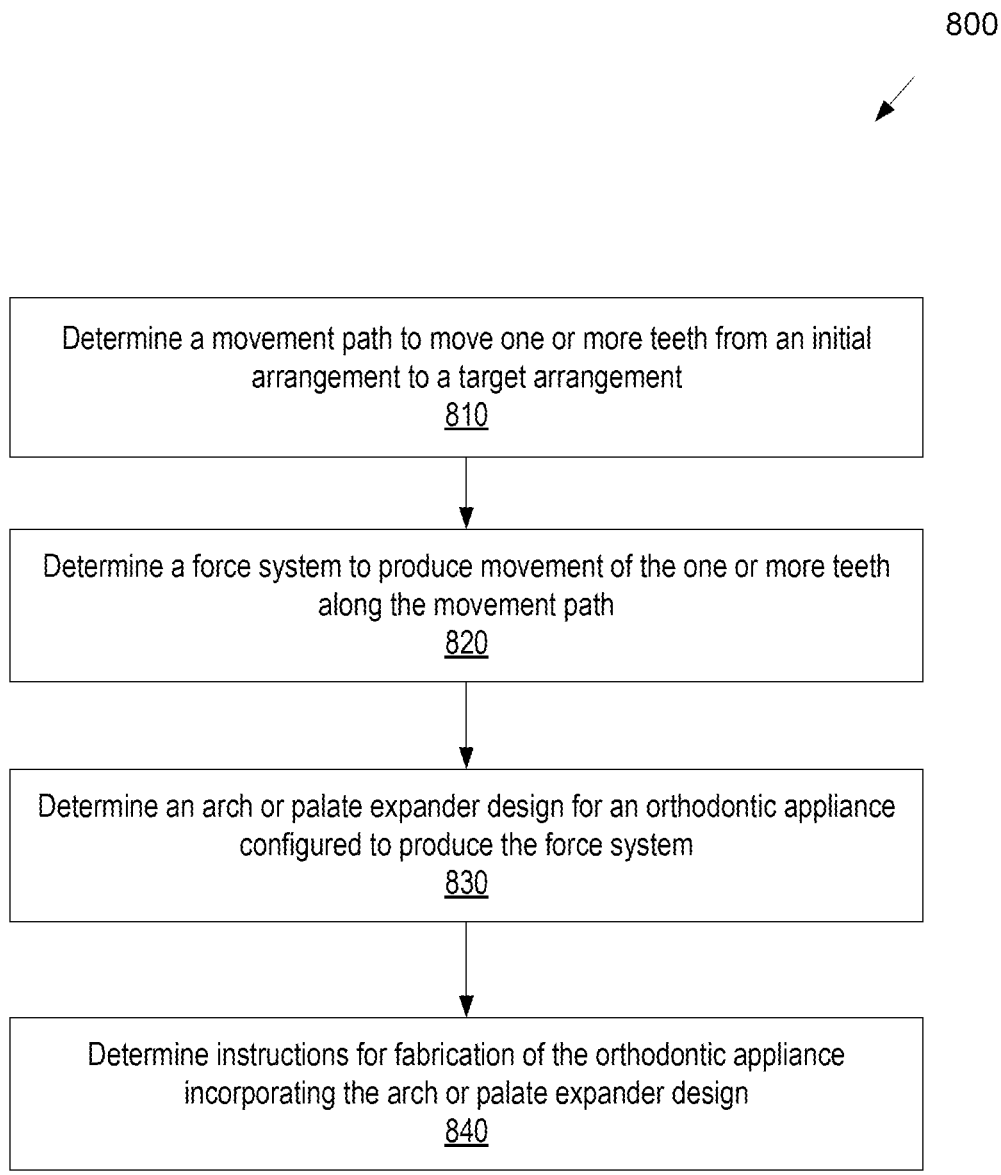
FIG. 8 illustrates a method for designing an orthodontic appliance, according to certain embodiments.

FIG. 8 illustrates a method 800 for designing an orthodontic appliance, according to certain embodiments. The orthodontic appliance may be produced using a mold 110 attached to a pre-fabricated attachment 120. The orthodontic appliance may be produced by direct fabrication. The method 800 can be applied to any embodiment of the orthodontic appliances described herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the orthodontic appliance are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 800 may comprise additional blocks: 1) The upper arch and palate of the patient is scanned intraorally to generate three dimensional data of the palate and upper arch; 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Once designed and/or planned, a series of preformed aligners may be fabricated from a material that, alone or in combination with attachments, imparts forces to a patient's teeth. Example materials include one or more polymeric materials. Fabrication may involve thermoforming aligners using a series of molds (e.g., 3D-printed molds) and/or directly fabricating the aligners. For some thermoforming fabrication techniques, shells are formed around molds to achieve negatives of the molds. The shells are then removed from the molds to be used for various applications. One example application in which a shell is formed around a mold and then later used is corrective dentistry or orthodontic treatment. In such an application, the mold may be a positive mold of a dental arch for a patient and the shell may be an aligner to be used for aligning one or more teeth of the patient. When attachments (e.g., planned orthodontic attachments) are used, the mold may also include features associated with the attachments.

Molds may be formed using a variety of techniques, such as casting or rapid prototyping equipment. For example, 3D printers may manufacture molds of aligners using additive manufacturing techniques (e.g., stereolithography) or subtractive manufacturing techniques (e.g., milling). The aligners may then be formed over the molds using thermoforming techniques. Once an aligner is formed, it may be manually or automatically trimmed. In some instances, a computer controlled 4-axis or 5-axis trimming machine (e.g., a laser trimming machine or a mill) is used to trim the aligner along a cutline. The trimming machine uses electronic data that identifies the cutline to trim the aligner. Thereafter, the aligner may be removed from the mold and delivered to the patient. As another example, aligners may be directly fabricated using, e.g., stereolithography (SLA), digital light processing (DLP), and/or other 3D printing techniques.

Aligners (also referred to herein as "orthodontic aligners") may include dental appliances (also referred to herein as "appliances") applied to a patient's dentition and used to treat malocclusions. Examples of aligners and aligner systems may be found in FIGS. 7A-B. An example treatment method using aligners is shown in FIG. 7C. Aligners may be formed from polymeric materials using indirect or direct fabrication techniques, examples of which may be found in conjunction with the discussion of FIGS. 7A-C. As noted further herein, during the indirect fabrication of aligners, many aligners may experience strains/stresses from being removed from molds. Additionally, during use (whether aligners are formed indirectly or directly), many aligners may experience strains/stresses from residing in an intra-oral environment for extended periods of time (e.g., up to twenty-three hours a day for several weeks) or from being repeatedly removed (e.g., up to several times a day for several weeks) from a patient's dentition.

Once designed, each aligner may be manufactured by forming polymeric material to implement one or more stages of a treatment plan on a patient's dentition, e.g., through indirect fabrication techniques or direct fabrication techniques. Examples of indirect and direct fabrication techniques are further described herein with respect to FIGS. 7A-C.

In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 712, 714, 716. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 712, 714, 716 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 712, 714, 716 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 712, 714, 716. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 712, 714, 716 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Figure 9:
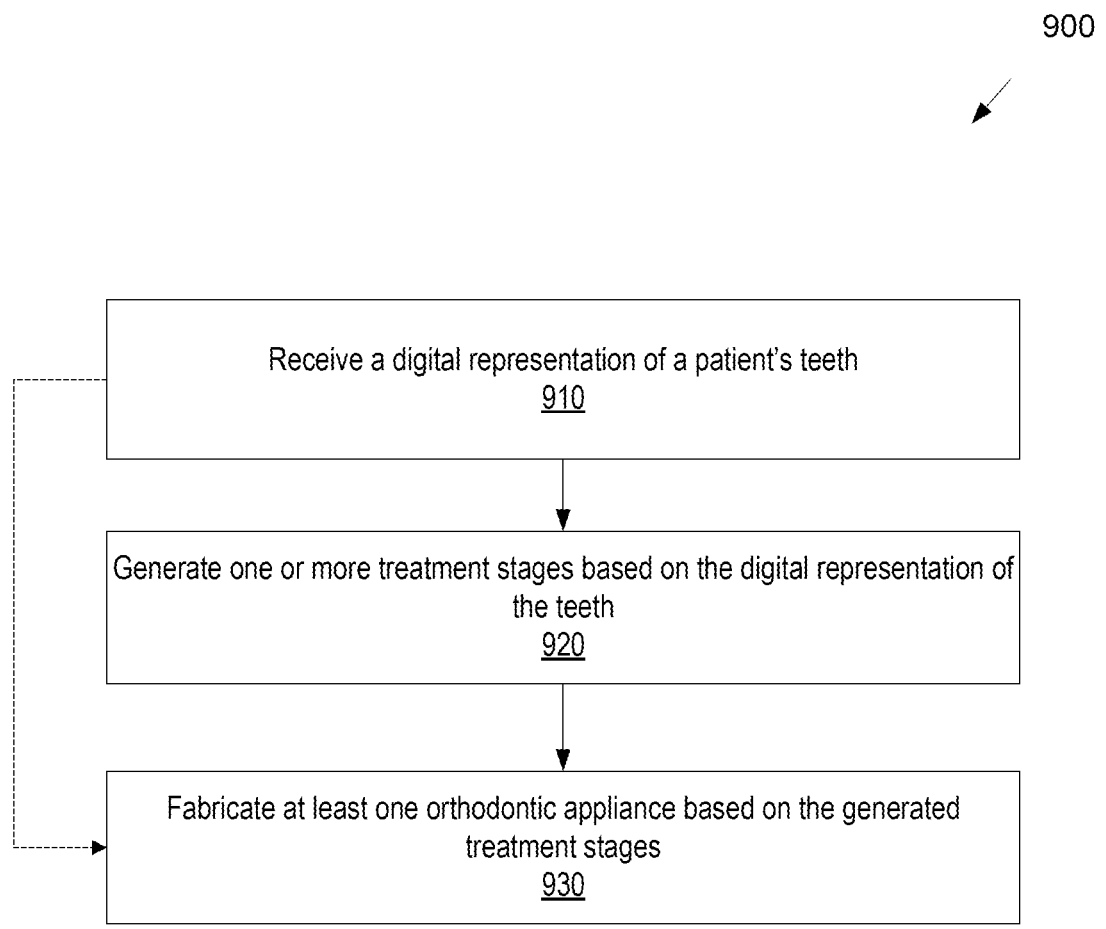
FIG. 9 illustrates a method for digitally planning an orthodontic treatment, according to certain embodiments.

FIG. 9 illustrates a method 900 for digitally planning an orthodontic treatment and/or design or fabrication of an appliance, according to certain embodiments. The appliance may be produced using a mold attached to a pre-fabricated attachment 120, as described herein. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A system comprising:
   a mold of a dental arch of a patient, the mold comprising a plurality of teeth extending from a first distal end of the dental arch to a second distal end of the dental arch, wherein an orthodontic aligner is to be formed over the plurality of teeth of the mold, the plurality of teeth of the mold being shaped to correspond to a plurality of tooth-receiving cavities of the orthodontic aligner; and
   a pre-fabricated attachment comprising:
      a structure that extends from a first inner sidewall of the mold to a second inner sidewall of the mold;
      a traceability component configured to be used to determine one or more identifiers corresponding to the mold; and
      a handling component extending from the structure, wherein the handling component is configured to be secured by a robot or person to transport the mold and the pre-fabricated attachment during production of the orthodontic aligner.

2. The system of claim 1, wherein the mold is non-removably attached to the pre-fabricated attachment.

3. The system of claim 1, wherein the pre-fabricated attachment is integral to the mold.

4. The system of claim 1, wherein the first inner sidewall is a first lingual portion of the mold, and wherein the second inner sidewall is a second lingual portion of the mold, the structure comprising at least one of a beam or a bar.

5. The system of claim 1, wherein the traceability component is an identifier engraved or formed through the structure.

6. The system of claim 1, and wherein the handling component is off-centered on the structure.

7. The system of claim 1, wherein the pre-fabricated attachment comprises:
   a first attachment feature on a first distal end of the structure that attaches to a first mold feature of the mold at a first lingual side of the mold; and
   a second attachment feature on a second distal end of the structure that attaches to a second mold feature of the mold at a second lingual side of the mold.

8. A method comprising:
   identifying a mold of a dental arch of a patient, the mold comprising a plurality of teeth extending from a first distal end of the dental arch to a second distal end of the dental arch, wherein an orthodontic aligner is to be formed over the plurality of teeth of the mold, the plurality of teeth of the mold being shaped to correspond to a plurality of tooth-receiving cavities of the orthodontic aligner;
   causing a pre-fabricated attachment to be attached to the mold, the pre-fabricated attachment comprising a structure that extends from a first inner sidewall of the mold to a second inner sidewall of the mold;
   associating a traceability component of the pre-fabricated attachment with a patient identifier (PID) of the patient and a treatment stage corresponding to the mold; and
   causing a handling component extending from the structure of the pre-fabricated attachment to be secured by a robot or a person to transport the mold and the pre-fabricated attachment during production of the orthodontic aligner.

9. The method of claim 8, wherein the causing of the pre-fabricated attachment to be attached to the mold comprises causing the pre-fabricated attachment to be non-removably attached to the mold.

10. The method of claim 8, wherein the first inner sidewall is a first lingual portion of the mold, and wherein the second inner sidewall is a second lingual portion of the mold, the structure comprising at least one of a beam or a bar.

11. The method of claim 8, wherein the traceability component is an identifier engraved or formed through the structure.

12. The method of claim 8, wherein the handling component is off-centered on the structure.

13. The method of claim 8, wherein the pre-fabricated attachment comprises:
   a first attachment feature on a first distal end of the structure that attaches to a first mold feature of the mold at a first lingual side of the mold; and
   a second attachment feature on a second distal end of the structure that attaches to a second mold feature of the mold at a second lingual side of the mold.

14. A pre-fabricated attachment for a mold, the pre-fabricated attachment comprising:
   a structure that extends from a first inner sidewall of the mold to a second inner sidewall of the mold;
   a traceability component configured to be used to determine one or more identifiers corresponding to the mold; and
   a handling component extending from the structure, wherein the handling component is configured to be secured by a robot or person to move the mold and the pre-fabricated attachment during production of an orthodontic aligner.

15. The pre-fabricated attachment of claim 14, wherein the pre-fabricated attachment is configured to non-removably attach to the mold.

16. The pre-fabricated attachment of claim 14, wherein the first inner sidewall is a first lingual portion of the mold, and wherein the second inner sidewall is a second lingual portion of the mold.

17. The pre-fabricated attachment of claim 14, wherein the structure comprises at least one of a beam or a bar.

18. The pre-fabricated attachment of claim 14, wherein the traceability component is an identifier engraved or formed through the structure.

19. The pre-fabricated attachment of claim 14, wherein the handling component is off-centered on the structure.

20. The pre-fabricated attachment of claim 14, wherein the pre-fabricated attachment comprises:
   a first attachment feature on a first distal end of the structure that attaches to a first mold feature of the mold at a first lingual side of the mold; and
   a second attachment feature on a second distal end of the structure that attaches to a second mold feature of the mold at a second lingual side of the mold.

* * * * *